(12) United States Patent
Huang

(10) Patent No.: US 11,104,070 B2
(45) Date of Patent: Aug. 31, 2021

(54) 3D PRINTING HEAD, 3D PRINTING DEVICE AND CONTROL METHOD OF 3D PRINTING HEAD

(71) Applicant: Weidong Huang, Shaanxi (CN)

(72) Inventor: Weidong Huang, Shaanxi (CN)

( * ) Notice: Subject to any disclaimer, the term of this patent is extended or adjusted under 35 U.S.C. 154(b) by 508 days.

(21) Appl. No.: 16/107,450

(22) Filed: Aug. 21, 2018

(65) Prior Publication Data
US 2018/0354194 A1 Dec. 13, 2018

Related U.S. Application Data

(63) Continuation of application No. PCT/CN2017/083647, filed on May 9, 2017.

(51) Int. Cl.
*B29C 64/209* (2017.01)
*B33Y 30/00* (2015.01)
*B29C 64/393* (2017.01)
*B33Y 50/02* (2015.01)
*B29C 64/106* (2017.01)
(Continued)

(52) U.S. Cl.
CPC ............ *B29C 64/209* (2017.08); *B22F 10/10* (2021.01); *B29C 64/106* (2017.08); *B29C 64/118* (2017.08); *B29C 64/227* (2017.08); *B29C 64/393* (2017.08); *B33Y 30/00* (2014.12); *B33Y 50/02* (2014.12); *B22F 10/00* (2021.01);
(Continued)

(58) Field of Classification Search
CPC ... B29C 64/209; B29C 64/118; B29C 64/393; B29C 64/227; B29C 64/106; B29C 64/321; B29C 64/343; B33Y 30/00; B33Y 50/02; B22F 10/00; B22F 2999/00; B22F 10/10

USPC .................................................. 425/113, 375
See application file for complete search history.

(56) References Cited

U.S. PATENT DOCUMENTS

| | | | |
|---|---|---|---|
| 6,030,199 A | * | 2/2000 | Tseng ...................... B29C 41/52 425/132 |
| 6,372,178 B1 | | 4/2002 | Tseng |
| 2017/0182701 A1 | * | 6/2017 | Ryan ..................... B29C 64/106 |

FOREIGN PATENT DOCUMENTS

| | | |
|---|---|---|
| CN | 104044271 A | 9/2014 |
| CN | 10414932 A | 11/2014 |

(Continued)

OTHER PUBLICATIONS

Search Report dated Feb. 9, 2018 for Application No. PCT/CN2017/083647.

(Continued)

*Primary Examiner* — Joseph S Del Sole
*Assistant Examiner* — Lawrence D. Hohenbrink, Jr.
(74) *Attorney, Agent, or Firm* — Ladas & Parry LLP

(57) ABSTRACT

A 3D printing head, a 3D printing device and a control method of the 3D printing head are provided. The 3D printing head includes a feeding pipe, provided with an opening at its bottom; a shutter, disposed at the opening and slidably connected to the bottom, where the opening includes a region occluded by the shutter and a region not occluded by the shutter, and the region not occluded by the shutter forms a discharge port of the 3D printing head, where the discharge port includes a first end and a second end, and the first end and the second end define a length of the discharge port; and a drive apparatus, used to drive the shutter sliding at the opening to adjust the length of the discharge port. The 3D printing head makes it possible to take both printing efficiency and printing accuracy into account.

14 Claims, 11 Drawing Sheets

(51) Int. Cl.
  *B29C 64/118* (2017.01)
  *B22F 10/10* (2021.01)
  *B29C 64/227* (2017.01)
  *B29C 64/321* (2017.01)
  *B22F 10/00* (2021.01)
  *B29C 64/343* (2017.01)

(52) U.S. Cl.
  CPC ......... *B22F 2999/00* (2013.01); *B29C 64/321* (2017.08); *B29C 64/343* (2017.08)

(56) References Cited

FOREIGN PATENT DOCUMENTS

| | | |
|---|---|---|
| CN | 104369385 A | 2/2015 |
| CN | 205588644 U | 9/2016 |
| CN | 206124217 U | 4/2017 |
| EP | 3 117 982 A1 | 1/2017 |
| EP | 3117982 A1 * | 1/2017 ........... B29C 64/106 |
| KR | 10-2016-0124554 A | 10/2016 |
| WO | 2016/052228 A1 | 4/2016 |
| WO | 2016/149032 A1 | 9/2016 |

OTHER PUBLICATIONS

English abstract for CN 104044271 A.
English abstract for CN 104369385 A.
English abstract for CN 10414932 A.
English abstract for WO 2016/052228 A1.
English abstract for WO 2016/149032 A1.
English abstract for KR 10-2016-0124554 A.
Supplementary European Search Report (SESR) dated Oct. 17, 2019 for Application No. EP 17895505.0.

* cited by examiner

3D PRINTING HEAD, 3D PRINTING DEVICE AND CONTROL METHOD OF 3D PRINTING HEAD

CROSS-REFERENCE TO RELATED APPLICATIONS

This application is a continuation of International Application No. PCT/CN2017/083647, filed on May 9, 2017, the disclosure of which is hereby incorporated by reference in its entirety.

TECHNICAL FIELD

The present application relates to a field of 3D printing, in particular to a 3D printing head, a 3D printing device, and a control method of the 3D printing head.

BACKGROUND

The fused deposition modeling (FDM) technology is a common 3D printing technology. The FDM technology generally needs to heat a material to a fused state (or a semi-flow state), and extrude the fused material from a discharge port (or extrusion port) of a 3D printing head. The material is deposited layer by layer on a printing platform to form a 3D article.

A discharge port of a conventional 3D printing head is generally a nozzle with a fixed shape. When an article is required to be high in printing accuracy, a 3D printing head with a small-diameter nozzle is generally selected. Such type of 3D printing head has less material extrusion per unit time and is lower in printing efficiency. When an article is required to be high in printing efficiency, a 3D printing head with a large-diameter nozzle is generally selected. Such type of 3D printing head is lower in printing accuracy and the printed article is in a rough shape. Thus, it can be seen that the conventional 3D printing head cannot take both printing efficiency and printing accuracy into account.

The 3D printing technology is mainly used for industrial production in future. For an industrial product, efficiency and accuracy are equally important. Therefore, it is urgent to provide a 3D printing head that is more suitable for 3D printing.

SUMMARY

The present application provides a 3D printing head, a 3D printing device and a control method of the 3D printing head, making it possible to take both printing efficiency and printing accuracy of 3D printing into account.

In a first aspect, a 3D printing head is provided, which includes: a feeding pipe, provided with an opening at its bottom; a shutter, disposed at the opening and slidably connected to the bottom, where the opening includes a region occluded by the shutter and a region not occluded by the shutter, and the region not occluded by the shutter forms a discharge port of the 3D printing head, where the discharge port includes a first end and a second end, and the first end and the second end define a length of the discharge port; and a drive apparatus, connected to the shutter, where the drive apparatus receives a control instruction of a control apparatus and drives the shutter sliding at the opening according to the control instruction of the control apparatus to adjust a position of the first end and/or a position of the second end in the opening, so as to adjust the length of the discharge port.

In a second aspect, a 3D printing device is provided, which includes the 3D printing head and a control apparatus according to the first aspect.

In a third aspect, a control method of a 3D printing head is provided, where the 3D printing head is a 3D printing head described in the first aspect, and the control method includes: generating a control instruction of the control apparatus; and sending the control instruction of the control apparatus to the 3D printing head.

In a fourth aspect, a computer-readable storage medium is provided, in which instructions are stored, where the instructions, when executed on a 3D printing device, enable the 3D printing device to perform the method according to the first aspect.

In a fifth aspect, a computer program product including instructions are provided, where the instructions, when executed on a 3D printing device, enable the 3D printing device to perform the method according to the above first aspect.

By fully considering characteristics of a 3D print object, a discharge port of a 3D printing head is designed to be continuously adjustable in length. Such a 3D printing head makes it possible to take both printing efficiency and printing accuracy into account, which is more suitable for 3D printing.

DESCRIPTION OF EMBODIMENTS

For ease of understanding, a brief introduction to a conventional 3D printing device is first provided.

Figure 1:
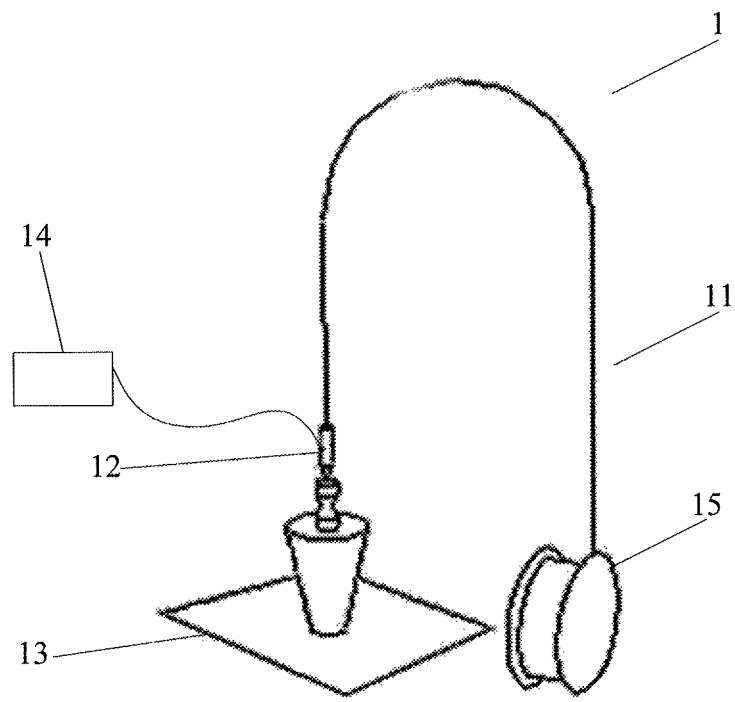
FIG. 1 is a schematic diagram of an overall structure of a conventional 3D printing device.

As shown in FIG. 1, a conventional 3D printing device 1 generally includes a feeding apparatus 11, a 3D printing head 12, a printing platform 13 and a control apparatus 14.

The feeding apparatus 11 may be connected to a scroll 15. In an actual printing process, the feeding apparatus 11 may take a filamentous material from the scroll 15, and convey the filamentous material to the 3D printing head 12. A material used in a 3D printing process is generally a thermoplastic material, such as a high-molecular polymer, a low-melting-point metal, or other materials that can be formulated as flowable pastes (such as paste-like ceram, high-melting-point metal powder mixtures, cement or the like).

Figure 2:
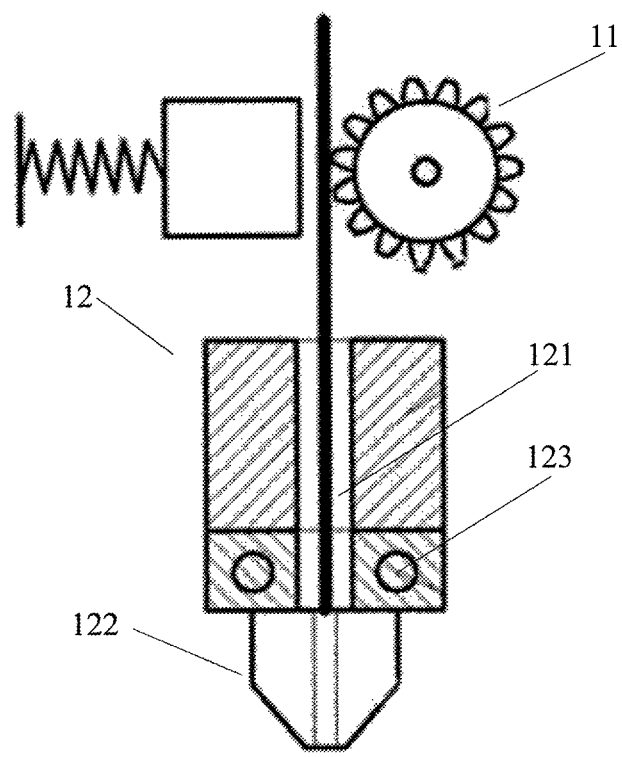
FIG. 2 is a schematic diagram of a structure of a conventional 3D printing head.

As shown in FIG. 2, the 3D printing head 12 generally includes a feeding pipe 121, a discharge port 122 and a temperature control apparatus 123. The temperature control apparatus 123 is generally disposed outside the feeding pipe 121 and configured to heat a material conveyed by the feeding apparatus 11 to the feeding pipe 121 to a molten state. The temperature control apparatus 123 may be, for example, a heating apparatus. The discharge port 122 may extrude the material in a molten state onto the printing platform 13, and therefore, the discharge port 122 may also be referred to as an extruding port.

As shown in FIG. 1, the control apparatus 14 is configured to control the 3D printing head 12 to print an article layer by layer. During a process of printing any layer of an article, the 3D printing head 12 may be controlled to completely fill a filling region (the region is enclosed by a cross-sectional contour line of the layer) of the layer according to a preset filling path.

An overall process of conventional 3D printing is generally as follows:

Before an article is printed, a 3D model of the article may be created by using modeling software. The modeling software may be, for example, computer aided design (CAD) software. Then, a layer processing is performed on the created 3D model, so as to divide the 3D model into multiple layers and obtain layer data of each layer. The layer processing of a 3D model is considered as decomposing a 3D article printing process into many 2D printing processes, and the printing process of each layer is similar to a planar 2D printing process. After obtaining the layer data of each layer, the control apparatus 14 may control the 3D printing head 12 to move along a certain filling path according to the layer data of each layer, and in a process of movement, the material in a molten state is extruded onto the printing platform 13 through the discharge port 122 to fill a filling region of each layer. After all layers of the article are printed, the material is solidified layer by layer to form a 3D article.

For ease of understanding, a filling process of a layer (hereinafter referred to as the current layer) in the conventional 3D printing process will be described in detail below, taking FIG. 3a and FIG. 3b as examples.

Figure 3A:
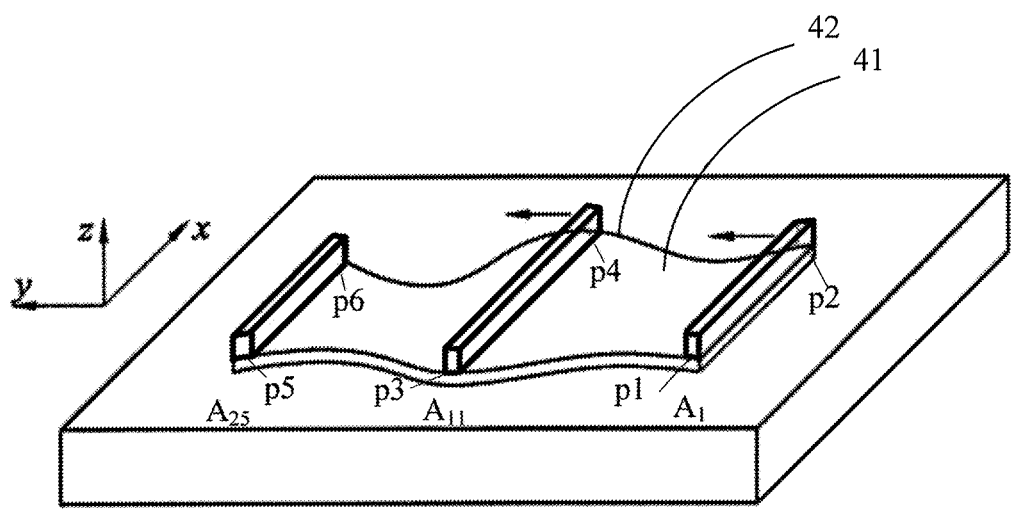
FIG. 3a is an exemplary diagram of a filling region of a layer.
Figure 3B:
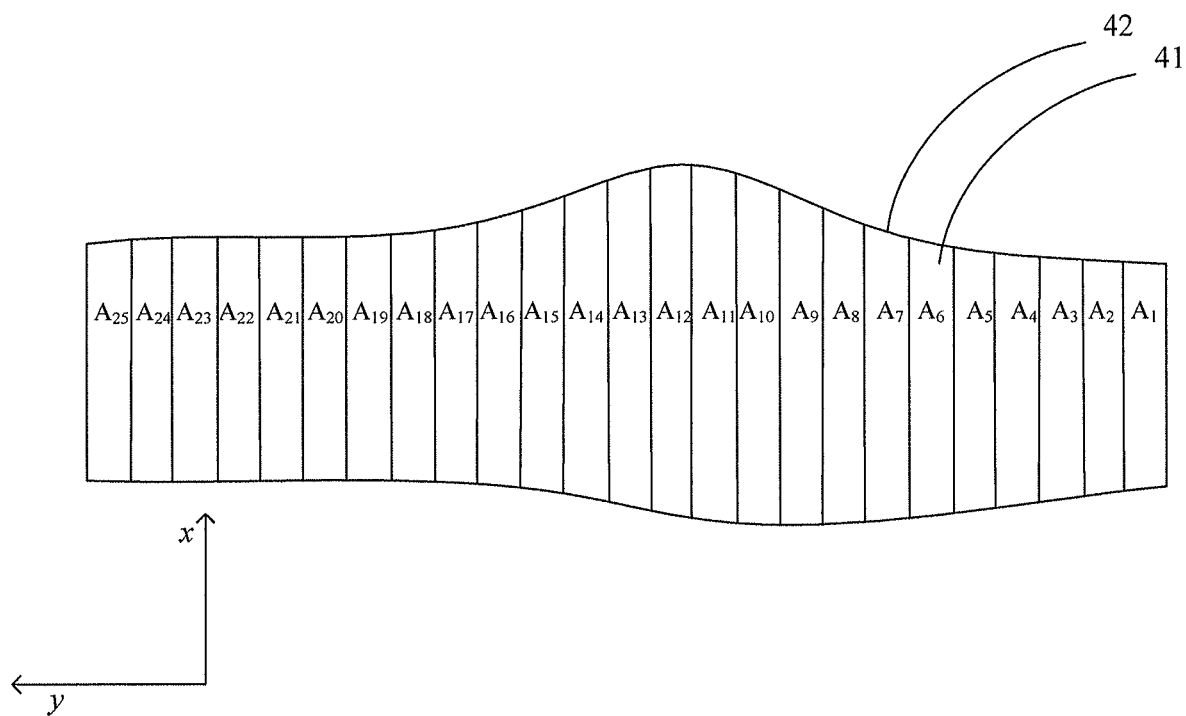
FIG. 3b is an exemplary diagram of an arrangement manner of passes.

Referring to FIG. 3a and FIG. 3b, a filling region of the current layer is region 41, and a cross-sectional contour line of the region 41 is cross-sectional contour line 42.

In order to completely fill the filling region 41, the region 41 is generally divided into a plurality of closely arranged passes based on the cross-sectional contour line 42, such as pass $A_1$ to pass $A_{25}$ shown in FIG. 3b.

In a process of printing the current layer, the control apparatus 14 controls a z-coordinate of the 3D printing head 12 to be unchanged, and controls the 3D printing head 12 to completely fill all passes in a certain order, for example, filling paths $A_1$-$A_{25}$ in sequence along a straight path in a parallel reciprocation manner.

Taking a filling process of pass $A_1$ as an example, the control apparatus 14 may first move the 3D printing head 12 to a position above position point p1 shown in FIG. 3a, and then control the 3D printing head 12 to move from the position above the position point p1 to a position above position point p2. During a movement process, a material in a molten state is extruded onto the pass $A_1$ through the discharge port 122, so as to fill the pass $A_1$. A filling manner of other passes is similar, and will not be described redundantly herein. After all the passes are filled, a printing process of the current layer is completed, and the 3D printing head 12 or the work platform 13 may be controlled to move along the z-axis direction to prepare printing of a next layer.

The discharge port 122 of the 3D printing head 12 is generally designed as a nozzle with a fixed shape. A common shape of the nozzle includes a round hole, a square hole, or a slightly deformed irregular shaped hole with equal diameter. A diameter of the nozzle is generally about 1 mm, and a common diameter is 0.4 mm. When an article is required to be high in printing accuracy, a 3D printing head with a small-diameter nozzle is generally selected. Such type of 3D printing head has less material extrusion per unit time and is lower in printing efficiency. When an article is required to be high in printing efficiency, a 3D printing head with a large-diameter nozzle is generally selected. Such type of 3D printing head is lower in printing accuracy and the printed article is in a rough shape. Thus, it can be seen that the conventional 3D printing head cannot take both printing efficiency and printing accuracy into account. A formation process of such design manner of a 3D printing head is analyzed below.

A 3D printing technology is a more advanced manufacturing technology developed on the basis of 2D printing technology. Generally, before 3D printing, it needs to perform layer processing on a 3D model of an article to be printed. The layer processing is equivalent to decomposing a 3D article printing process into many 2D printing processes, that is, a printing process of each layer may be considered as a planar printing process. Therefore, the conventional 3D printing device uses many design concepts of a 2D printing device. Most obviously, a discharge port of a 2D printing head generally adopts a nozzle with a fixed shape. A design of a discharge port of a 3D printing head, following the design manner of the 2D printing head, is also designed as a nozzle with a fixed-shape. As mentioned above, the design of such type of nozzle, which causes that 3D printing cannot take both print efficiency and print accuracy into account, becomes a key obstacle to the development of the 3D printing technology.

Therefore, there is an urgent need to provide a printing head which is not constrained by the design concept of the discharge port of the 2D printing head and is more suitable for 3D printing.

A 3D printing head provided by an embodiment of the present application will be described in detail below with reference to FIG. 4.

Figure 4:
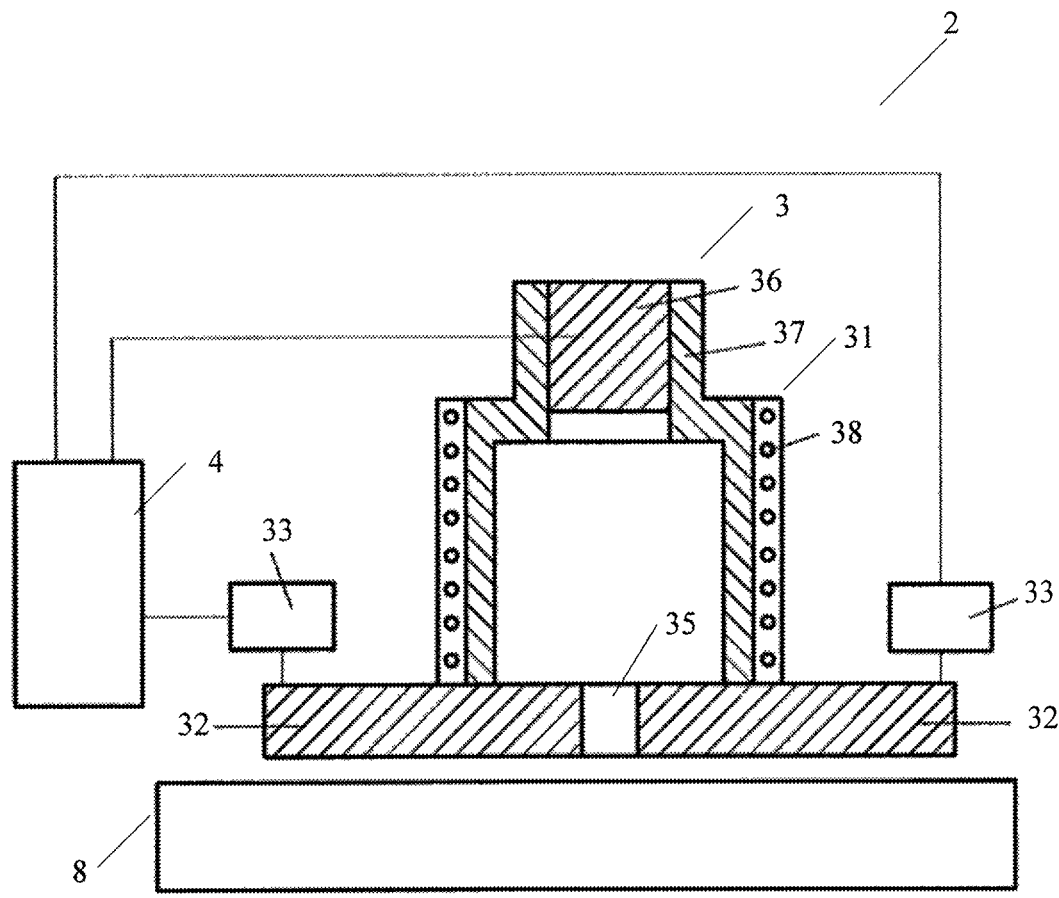
FIG. 4 is a schematic diagram of an overall structure of a 3D printing device provided by an embodiment of the present application.

FIG. 4 is a schematic diagram of an overall structure of a 3D printing device 2 provided by an embodiment of the present application. As shown in FIG. 4, the 3D printing device 2 may include a 3D printing head 3. Further, in some embodiments, the 3D printing device 2 may further include a control apparatus 4 (which may be a numerical control apparatus, for example) and/or a printing platform 8.

The 3D printing head 3 may include a feeding pipe 31, a shutter 32 and a drive apparatus 33.

The drive apparatus 33 may be connected (e.g., electrically connected) to the control apparatus 4. The drive apparatus 33 may receive a control instruction of the control apparatus 4 and drive the shutter 32 to move according to the control instruction of the control apparatus 4. The drive apparatus 33 may be an electric drive apparatus, a hydraulic drive apparatus, a pneumatic drive apparatus or a compound drive apparatus, which is not specifically limited in the embodiment of the present application. Taking an electric drive apparatus as an example, the drive apparatus 33 may include an electric motor and a transmission apparatus connected to the electric motor, such as a gear, a shaft or the like. The control apparatus 4 may send a control instruction to the drive apparatus 33 to control rotation speed and steering and the like of the electric motor, so as to implement the control of the drive apparatus 33. The drive apparatus 33 may drive the shutter 32 to slide at the bottom 39 of the feeding pipe 31, for example, performing a reciprocating linear movement at the bottom 39 of the feeding pipe 31.

Figure 5:
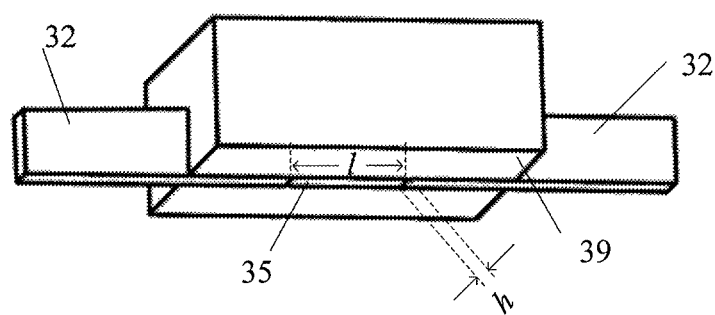
FIG. 5 is a schematic diagram of a bottom structure of a feeding pipe provided by an embodiment of the present application.

FIG. 5 is a schematic diagram of a bottom structure of the feeding pipe 31. FIGS. 6-10 are upward views of the bottom structure of the feeding pipe 31, where FIGS. 7-10 retain the shutter 32, and FIG. 6 removes the shutter 32 to better show where an opening 34 lies in the bottom 39.

Figure 6:
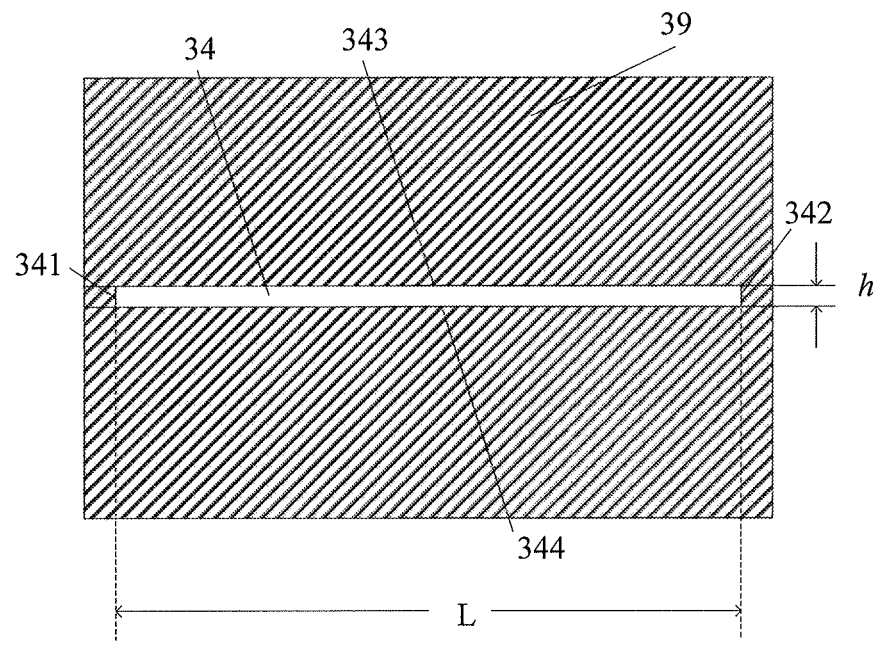
FIG. 6 is an upward view of a bottom structure of a feeding pipe provided by one embodiment of the present application.

Referring to FIG. 6, the bottom 39 of the feeding pipe 31 is provided with the opening 34. A length of the opening 34 may be L, and a width may be h. In other words, the opening 34 may occupy a region with an area of L×h at the bottom 39 of the feeding pipe 31. The opening 34 provided by the embodiment of the present application may have an elongated structure. In other words, the length L of the openings 34 may be much larger than the width h.

The value of the length L of the opening 34 may be selected according to actual needs, which is not specifically limited in the embodiment of the present application. In fact, as long as the bottom 39 of the feeding pipe 31 is sufficiently wide, the length L of the opening 34 can take any value in theory. The width h of the opening 34 may take a fixed value, for example, any value from 0.01 to 5 mm. As can be seen from the following description, in some implementations, a value of the width h may determine printing accuracy and printing efficiency of an article, so that the value of the width h may be determined depending on requirements of the article on printing accuracy and printing efficiency. For example, when printing accuracy of an article is high, the width h may be set to 0.01 mm or less, so that the article is printed in high accuracy. For another example, when print efficiency of an article is required to be high, the value of the width h may be set to 1 mm-5 mm, so that the article is printed in high efficiency.

Referring to FIG. 5 and FIG. 7 to FIG. 10, the shutter 32 may be disposed at the opening 34, for example, at a front end of the opening 34. The opening 34 may include a region occluded by the shutter 32 and a region not occluded by the shutter 32, where the region not occluded by the shutter 32 may form a discharge port 35 of a 3D printing head 3.

Figure 7:
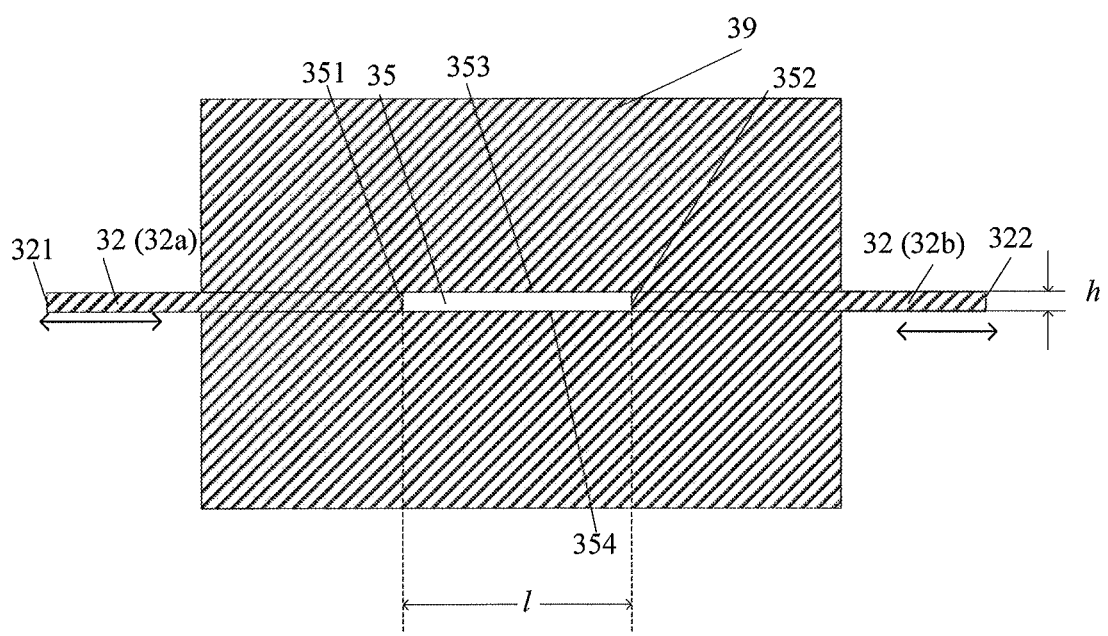
FIG. 7 is an upward view of a bottom structure of a feeding pipe provided by another embodiment of the present application.
Figure 8:
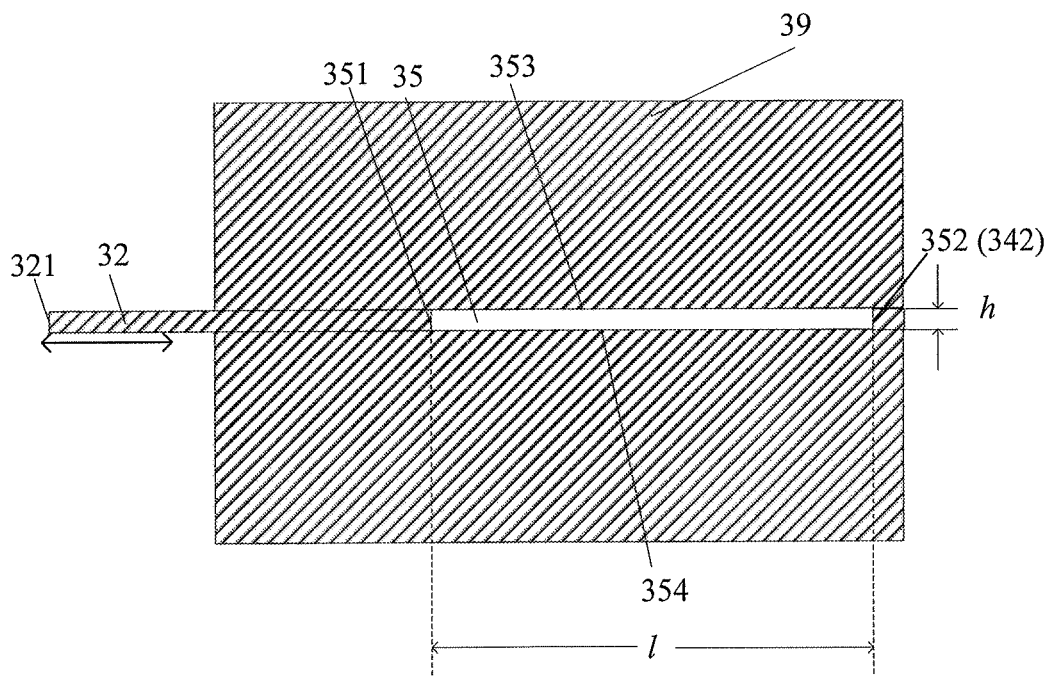
FIG. 8 is an upward view of a bottom structure of a feeding pipe provided by yet another embodiment of the present application.
Figure 9:
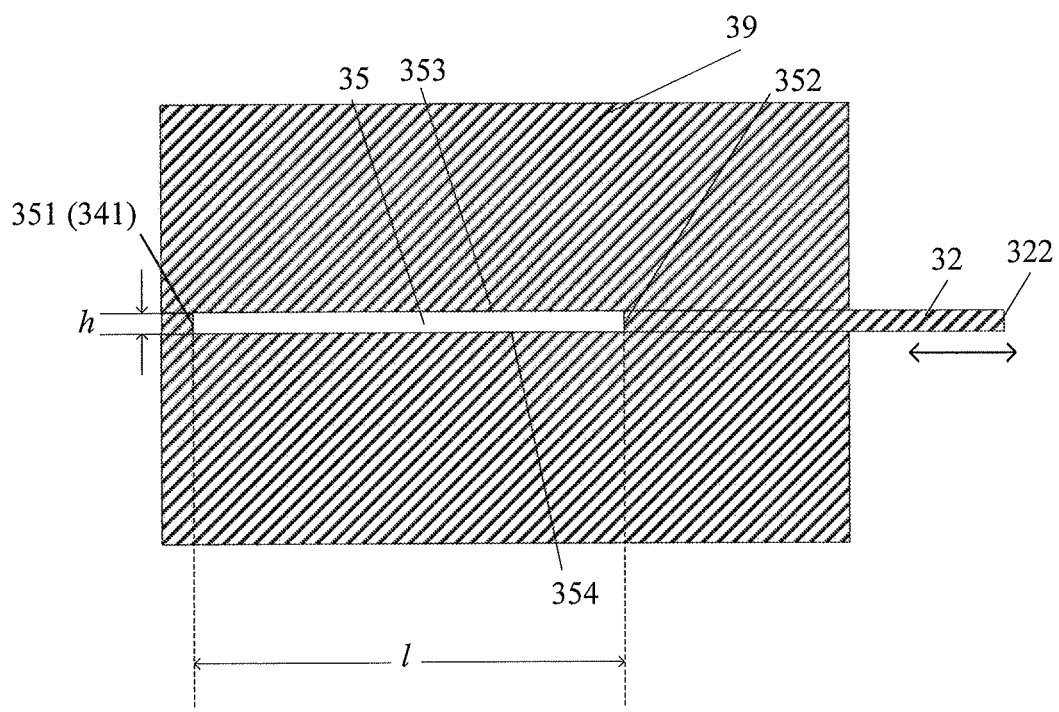
FIG. 9 is an upward view of a bottom structure of a feeding pipe provided by yet another embodiment of the present application.

As shown in FIG. 6, the region occupied by the opening 34 is L×h. As shown in FIG. 7 to FIG. 9, a region occupied by the discharge port 35 is l×h. Therefore, in embodiments of FIGS. 6-9, a region not occluded by the shutter 32 in the opening 34 is l×h, which is hereinafter referred to as an open region of the opening 34. A region occluded by the shutter 32 is (L−l)×h, which is hereinafter referred to as a closed region of the opening 34. In a process of printing an article, a material in a molten state is conveyed to the opening 34 through the feeding pipe 31. Due to existence of the closed region, the material in a molten state can only flow out from the open region, but not the closed region. Therefore, the open region forms the discharge port 35 of materials.

Optionally, in some embodiments, an area of the closed region of the opening 34 may be 0, indicating that the opening 34 is in a fully open state. In such case, the length of the discharge port 35 is equal to a length of the opening 34. Optionally, in other embodiments, an area of the open region of the opening 34 may be 0, indicating that the opening 34 is in a fully closed state. In such case, the length of the discharge port 35 is equal to 0.

Optionally, in some embodiments, a maximum length of the discharge port 35 may be less than a length of the opening 34. Referring to FIG. 5, the shutter 32 may be a movable block that can slide along a groove provided at the bottom of the feeding pipe 31. In order to ensure a dynamic seal between the movable block and the groove, or ensure that a sliding range of the movable block does not exceed a preset range, the maximum length l of the discharge port 35 may be controlled to be smaller than the length L of the opening 34.

Figure 10:
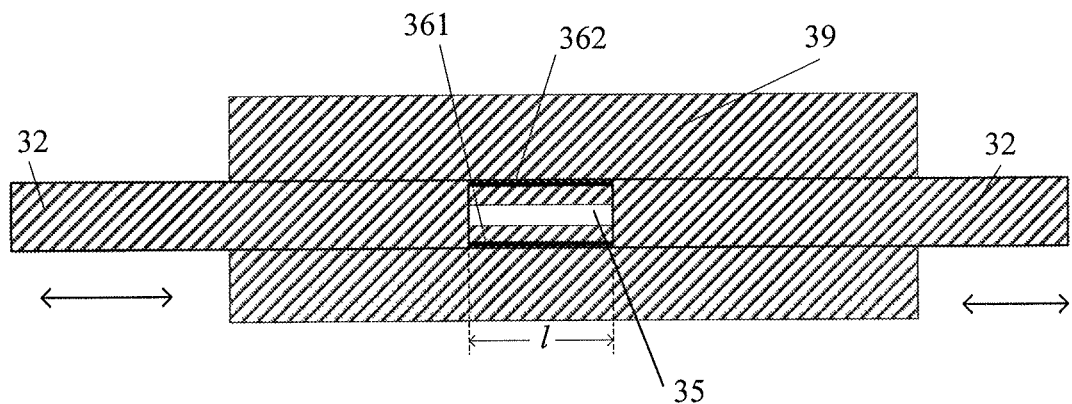
FIG. 10 is an upward view of a bottom structure of a feeding pipe provided by yet another embodiment of the present application.

It should be noted that quantity of shutters 32 is not specifically limited in the embodiment of the present application. As an example, as shown in FIG. 5, FIG. 7, and FIG. 10, there may be provided a shutter 32 at each end of the opening 34. As another example, as shown in FIG. 8 or FIG. 9, there may be provided a shutter 32 at only one end of the opening 34. It should be understood that the length of the discharge port 35 may be defined in different ways if the quantity of shutters 32 is different. Definition manners of the length of the discharge port 35 will be described in detail below with reference to FIG. 6 to FIG. 9.

As shown in FIG. 6, the opening 34 may include ends 341, 342, and the ends 341, 342 define the length of the opening 34. The shape of the opening 34 is not specifically limited by the embodiment of the present application. It may be an opening of any shape with an elongated structure. As shown in FIG. 6, the opening 34 may be a rectangular opening on the whole. The opening 34 may also include ends 343, 344. The ends 343, 344 may define a width of the opening 34.

In an embodiment corresponding to FIG. 7, there may be provided one shutter at each end of the opening 34, i.e., a first shutter 32a and a second shutter 32b. The discharge port 35 includes ends 351, 352, which define the length of the discharge port 35. The first shutter 32a includes ends 351, 321. As can be seen with reference to FIG. 6, the end 321 is located outside the end 341 of the opening 34, and the end 351 is located inside the end 341 of the opening 34. The second shutter 32*b* includes ends 352, 322. As can be seen with reference to FIG. 6, the end 322 is located outside the end 342 of the opening 34, and the end 352 is located inside the end 342 of the opening 34. As can be seen from FIG. 7, the end 351 of the discharge port 35 and the end of the first shutter 32*a* close to the second shutter 32*b* are the same end, and the end 352 of the discharge port 35 and the end of the second shutter 32*b* close to the first shutter 32*a* are the same end. Therefore, in the embodiment corresponding to FIG. 7, the length of the discharge port 35 is defined by a gap between the first shutter 32*a* and the second shutter 32*b*.

In an embodiment corresponding to FIG. 8, one end of the opening 34 is provided with a shutter 32 and the other end is not provided with any shutter. The shutter 32 includes ends 351, 321, where the end 321 is located outside the end 341 of the opening 34, and the end 351 is located inside the end 341 of the opening 34. As can be seen from FIG. 8, the end 352 of the discharge port 35 and the end 342 of the opening 34 are the same end. Therefore, in the embodiment corresponding to FIG. 8, the length of the discharge port 35 is defined by a gap between the shutter 32 and the end 342 of the opening 34.

In an embodiment corresponding to FIG. 9, one end of the opening 34 is provided with one shutter 32 and the other end is not provided with any shutter. The shutter 32 includes ends 352, 322, where the end 322 is located outside the end 342 of the opening 34, and the end 352 is located inside the end 342 of the opening 34. As can be seen from FIG. 9, the end 351 of the discharge port 35 and the end 341 of the opening 34 are the same end. Therefore, in the embodiment corresponding to FIG. 9, the length of the discharge port 35 is defined by a gap between the shutter 32 and the end 341 of the opening 34.

It should be noted that the form of the shutter 32 and the fitting manner of the shutter 32 and the feeding pipe 31 are not specifically limited in the embodiment of the present application.

As an example, as shown in FIG. 5, a bottom 39 of a feeding pipe 31 may be provided with a groove (not shown), and a shutter 32 may be a moveable block located in the groove and slidably connected with the groove. An opening 34 may be provided at the bottom of the groove.

As another example, as shown in FIG. 10, a bottom 39 of a feeding pipe 31 may be provided with a slide rail 361 and a slide rail 362. A shutter 32 may be a slide plate that can slide along the slide rails 361, 362.

A drive apparatus 33 may be connected to the shutter 32. The drive apparatus 33 may receive a control instruction of a control apparatus 4 and drive the shutter 32 to slide at an opening 34 according to the control instruction of the control apparatus 4, so as to adjust a position of an end 351 and/or an end 352 of a discharge port 35 in the opening 34, thereby adjusting a length of the discharge port 35.

As an example, as shown in FIG. 7, a drive apparatus 33 may respectively drive a first shutter 32*a* and a second shutter 32*b* to slide (for example, to perform a reciprocating linear movement), so as to change positions of ends 351, 352 in an opening 34, thereby adjusting a length of a discharge port 35.

As another example, as shown in FIG. 8, a drive apparatus 33 may drive a shutter 32 to slide (for example, to perform a reciprocating linear movement), so as to change a position of an end 351 in an opening 34, thereby adjusting a length of a discharge port 35.

As another example, as shown in FIG. 9, a drive apparatus 33 may drive a shutter 32 to slide (for example, to perform a reciprocating linear movement), so as to change a position of an end 352 in an opening 34, thereby adjusting a length of a discharge port 35.

It should be understood that a drive apparatus 33 may control a length of a discharge port 35 to vary within a preset range. The preset range may be less than or equal to a length of an opening 34. A variation in the length of the discharge port 35 may be understood as a continuous change. Of course, the so-called continuous change refers to a continuous change in the case that device accuracy (or a minimum adjustment step length) permits, and does not indicate that the discharge port 35 may reach any value within a preset range. Taking a preset range of 0-10 cm as an example, if device accuracy is 1 mm, a length of the discharge port 35 may be continuously changed in units of 1 mm, and for example, the length of the discharge port 35 may be 0 mm, 1 mm, 2 mm . . . 100 mm; if device accuracy is 5 mm, a length of the discharge port 35 may be continuously changed in units of 5 mm, for example, the length of the discharge port 35 may be 0 mm, 5 mm, 10 mm . . . 100 mm. The device accuracy is related to factors such as a mechanical structure and a control manner of a 3D printing device 2, which are not specifically limited in the embodiment of the present application.

A conventional 3D printing head follows design concepts of a 2D printing head, and a discharge port of the 3D printing head is designed as a nozzle with a fixed shape. A discharge port 35 of a 3D printing head 3 provided by the embodiment of the present application is designed to be continuously adjustable in length within a certain range. This is a design based on a full consideration of characteristics of a 3D print object. Compared with the conventional 3D printing head, the 3D printing head 3 provided by the embodiment of the present application makes it possible to take both printing efficiency and printing accuracy into account, and is more suitable for 3D printing. Specific discussion is as follows.

A size of a 2D print object is generally small, and the print object is mainly a text or an image. The text or image may be freely arranged in a two-dimensional plane and no law can be found. Therefore, it is common to design a 2D printing head as a nozzle with a fixed shape, and such design is reasonable in the field of 2D printing. Different from the 2D print object, a 3D print object is generally a 3D article that needs to be actually used. The 3D article has a certain physical contour, so that an intercept line of the 3D article along one section is generally one or more closed and continuously changing curves. According to an embodiment of the present application, the characteristics of the 3D print object are fully used. An opening 34 is provided at a bottom of a feeding pipe 31, and a shutter 32 is provided at the opening 34. Sliding of the shutter 32 at the opening 34 enables a discharge port 35 to be continuously adjustable in length. The continuous adjustment of the length of the discharge port 35 coincides with characteristics that a cross-sectional contour line of the 3D print object is closed and continuously changing. Such discharge port 35 is more suitable for 3D printing, making it possible to greatly increase the 3D printing efficiency. For example, with a 3D printing head provided by the embodiment of the present application, printing may be no longer performed according to a pass as a conventional 3D printing head, continuous printing may be performed along a cross-sectional contour line instead. During printing, the discharge port 35 is controlled to vary according to changes of the cross-sectional contour line. It may be understood that it has a greatly higher printing efficiency to print along the cross-sectional contour line compared to the manner of printing according to a pass.

Further, during printing, a width of an opening 34 may be set as a fixed value, enabling printing accuracy of a 3D article to be unchanged. The printing accuracy is maintained during continuous change of the discharge port 35, which is difficult to be realized by a conventional 3D printing head. Therefore, the embodiment of the present application provides a 3D printing head with a discharge port that is continuously adjustable in length, which makes it possible to take both printing efficiency and printing accuracy into account.

Optionally, in some embodiments, as shown in FIGS. 7-9, a discharge port 35 may further include ends 353, 354. The ends 353 and 354 may define a width of the discharge port 35.

As an implementation, the width of the discharge port 35 may be a fixed value, that is, a distance between the ends 353 and 354 may remain unchanged.

For a 3D article to be printed, it generally has the same requirement for printing accuracy. Taking this into consideration, in an embodiment of the present application, a value of a length of the discharge port 35 is set to be continuously changed, and a value of the width is set as a fixed value, so that it not only may ensure that printing efficiency of the discharge port 35 is improved, but also may ensure that printing accuracy of a 3D article is always consistent, which is not possible to be realized by a conventional 3D printing head.

As another implementation, a width of a discharge port 35 may be set as an adjustable width. For example, another shutter (not shown) may be disposed on a sidewall of the discharge port 35, and the shutter may slide along a width direction, so as to adjust the width of the discharge port 35. The implementation makes accuracy of a 3D printing head flexible and adjustable.

Optionally, in some embodiments, in a process of filling a target filling region in a current layer, a drive apparatus 33 may drive a shutter 32 sliding at an opening 34 according to a control instruction of the control apparatus 4 to adjust a position of an end 351 and/or an end 352 in the opening 34, so that a length of the discharge port 35 matches lengths of intercept line segments of a cross-sectional contour line of the target filling region along a length direction of the discharge port 35, where the target filling region is part or all of a filling region of the current layer. It should be understood that the current layer may be any layer of an article to be printed. A layer of the article to be printed may be obtained based on layer processing on a 3D model of the article to be printed.

The length of the discharge port 35 matches (or corresponds to) lengths of intercept line segments of a cross-sectional contour line of the target filling region along a length direction of the discharge port 35, which may refer to that the length of the discharge port 35 is substantially equal to or exactly equal to lengths of intercept line segments of a cross-sectional contour line of the target filling region along a length direction of the discharge port 35.

Taking a target filling region 41 as a region 41 shown in FIG. 3a as an example, it is assumed that an x direction is a length direction of a discharge port, a 3D printing head 3 may be controlled to move from position point $A_1$ to position point $A_{25}$. During the movement of the 3D printing head 3, positions of ends 351, 352 of a discharge port 35 in an opening 34 are controlled, so that a length between the ends 351 and 352 matches lengths of intercept line segments of a cross-sectional contour line 42 along the x direction.

For example, when the 3D printing head 3 is moved to a position where pass $A_1$ is located, a drive apparatus 33 may adjust positions of the end 351 and/or the end 352 of the discharge port 35 in the opening 34 through a shutter 32, so that a length of the discharge port 35 matches a length of a line segment p1-p2. In this way, pass $A_1$ may be printed at the same time. When the 3D printing head 3 is moved to a position where pass $A_{11}$ is located, the drive apparatus 33 may adjust positions of the end 351 and/or the end 352 of the discharge port 35 in the opening 34 through the shutter 32, so that the length of the discharge port 35 matches a length of a line segment p3-p4. In this way, pass $A_{11}$ may be printed at the same time. When the 3D printing head 3 is moved to a position where pass $A_{25}$ is located, the drive apparatus 33 may adjust positions of the end 351 and/or the end 352 of the discharge port 35 in the opening 34 through the shutter 32, so that the length of the discharge port 35 matches a length of a line segment p5-p6. In this way, pass $A_{25}$ may be printed at the same time.

During the movement of the 3D printing head 3, the length of the discharge port 35 always matches lengths of intercept line segments of the cross-sectional contour line of the target filling region along the length direction of the discharge port 35, so that one intercept line region (one intercept line region may correspond to one pass of conventional 3D printing) of the cross-sectional contour line may be printed completely at the same time, thereby greatly improving printing efficiency of the 3D printing.

Optionally, in some embodiments, in the process of filling a target filling region in the current layer, the drive apparatus 33 may also adjust the length of the discharge port 35 and relative positions of the discharge port 35 and the cross-sectional contour line of the target filling region simultaneously to further improve printing efficiency.

For example, in the process of filling the target filling region in the current layer, the drive apparatus 33 may drive the shutter 32 sliding at the opening 34 according to the control instruction of the control apparatus 4 to adjust positions of the end 351 and/or the end 352 in the opening 34, so that projection positions of the ends 351, 352 in the vertical direction are located on the cross-sectional contour line of the target filling region.

Taking the target filling region 41 as a region 41 shown in FIG. 3a as an example, a 3D printing head 3 may be controlled to move from the position point $A_1$ to the position point $A_{25}$. During the movement of the 3D printing head 3, the positions of ends 351, 352 of the discharge port 35 are controlled, so that the projection positions of the ends 351, 352 in the vertical direction are on the cross-sectional contour line 42.

For example, when the 3D printing head 3 is moved to the position where pass $A_1$ is located, a drive apparatus 33 may adjust positions of the end 351 and/or the end 352 of the discharge port 35 in the opening 34 through the shutter 32, so that a coordinate (x, y) of the end 351 is the same as a coordinate (x, y) of position point p1, and a coordinate (x, y) of the end 352 is the same as a coordinate (x, y) of a position point p2. In this way, the projection position of the end 351 in the vertical direction is located at the point p1 of the cross-sectional contour line 42 and the projection position of the end 352 in the vertical direction is located at the point p2 of the cross-sectional contour line 42. When the 3D printing head 3 is moved to a position where pass $A_{11}$ is located, the drive apparatus 33 may adjust positions of the end 351 and/or the end 352 of the discharge port 35 in the opening 34 through the shutter 32, so that a coordinate (x, y) of the end 351 is the same as a coordinate (x, y) of position point p3, and a coordinate (x, y) of the end 352 is the same as a coordinate (x, y) of a position point p4. In this way, the projection position of the end 351 in the vertical direction is located at the point p3 of the cross-sectional contour line 42 and the projection position of the end 352 in the vertical direction is located at the point p4 of the cross-sectional contour line 42. When the 3D printing head 3 is moved to a position where pass $A_{25}$ is located, the drive apparatus 33 may adjust positions of the end 351 and/or the end 352 of the discharge port 35 in the opening 34 through the shutter 32, so that a coordinate (x, y) of the end 351 is the same as a coordinate (x, y) of position point p5, and a coordinate (x, y) of the end 352 is the same as a coordinate (x, y) of a position point p6. In this way, the projection position of the end 351 in the vertical direction is located at the point p5 of the cross-sectional contour line 42 and the projection position of the end 352 in the vertical direction is located at the point p6 of the cross-sectional contour line 42.

It can be seen from the above description that, during the movement of the 3D printing head 3, the ends 351, 352 of the discharge port 35 are always aligned with the cross-sectional contour line of the target filling region in the vertical direction to track the cross-sectional contour line of the target filling region, which is a 3D printing manner completely different from the conventional 3D printing. This 3D printing manner may not only greatly improve printing efficiency of 3D printing, but also makes it possible to take both printing efficiency and printing accuracy into account.

The following description will compare performance of a 3D printing head 3 provided by an embodiment of the present application and a conventional 3D printing head in terms of print efficiency and print accuracy.

It is assumed that a discharge port of the conventional 3D printing head is a round-hole type discharge port, and a diameter of the round-hole type discharge port is equal to a width of the discharge port 35 of the 3D printing head 3 provided by the embodiment of the present application. It is easy to be obtained that an improvement in printing efficiency of the 3D printing head 3 is approximately a ratio of an average length of each pass in the target filling region to the diameter of the round-hole type discharge port. For example, a diameter of a currently commercially available round-hole type discharge port is approximately 0.4 mm, and if an average length of a pass in the target filling region is 20 mm, printing efficiency of the 3D printing head 3 is approximately 50 times that of the conventional 3D printing head. In addition, it may be understood that, compared with the conventional 3D printing head, the larger a size of an article to be printed, the more significant an improvement in printing efficiency of the 3D printing head 3 provided by the embodiment of the present application.

In addition, under the premise of guaranteeing printing efficiency, the width of the discharge port 35 of the 3D printing head 3 may be set very small to ensure ultra-high printing accuracy, which is not possible to be realized by a conventional 3D printing head. For example, a diameter of a currently commercially available round-hole type discharge port is about 0.4 mm, and if the diameter is set to be less than 0.4 mm, it will result in that printing efficiency of a 3D printing device is too low to be used in actual production. In contrast, the 3D printing head 3 provided by the embodiment of the present application may print out a contour of a target filling region at a time. In this case, even if the width of the discharge port 35 is set to be very small (for example, less than 0.4 mm), high printing efficiency still may be guaranteed. Moreover, the smaller the width of the discharge port 35 is, the closer a cross-sectional contour line of the target filling region printed by the 3D printing head 3 and an actual cross-sectional contour line are, and the higher an accuracy is.

For example, for printing in ultra-high accuracy, the width of the discharge port 35 may be set as 0.01 mm or less, which is much smaller than a single-layer printing thickness of all current industrial-grade 3D printing devices. Of course, in the case without high requirement in accuracy, the width of the discharge port 35 may be set as 1 mm to 5 mm to achieve ultra-high efficiency of printing.

The 3D printing head 3 provided by the embodiment of the present application makes it possible to take both printing efficiency and printing accuracy into account. Besides, compared with the conventional 3D printing head, an article printed by the 3D printing head 3 also has remarkable improvement in mechanical property and shape uniformity, which will be discussed in detail below.

Figure 11:
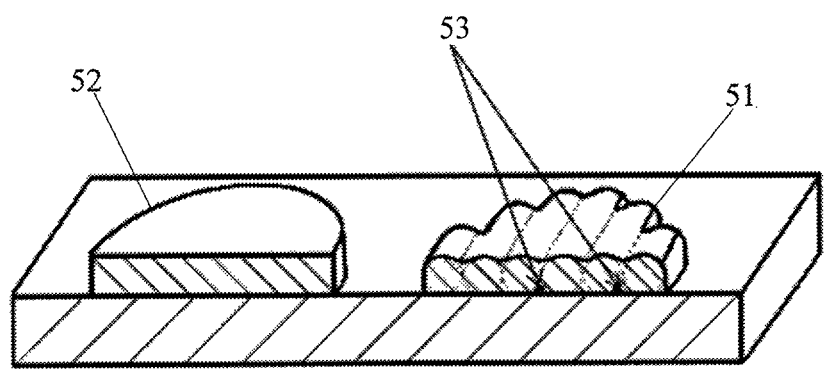
FIG. 11 is a comparison diagram of printing effects of a 3D printing head provided by an embodiment of the present application and a conventional 3D printing head.

As can be seen from the above description with reference to FIG. 3, conventional 3D printing is generally performed on a pass-by-pass basis according to a certain pass sequence. Since a size of a discharge port of the conventional 3D printing head is small (an aperture is generally in millimeter level), it takes a long time to print each pass. When a current pass is prepared to be printed, a material on a previous pass adjacent to the current pass may have been in or close to a solidification state, and a material on the current pass is still in a molten state. The material in the molten state on the current pass needs to be fused with the material on the previous pass that have been in or close to a solidification state to form an integral part. A process of material fusion between adjacent passes herein is called a pass overlap. In a process of a pass overlap, if the previous pass of the current pass has already solidified or been close to solidified and the current pass is still in a molten state, a phenomenon of poor fusion may occur in a material fusion process between adjacent passes, which results in a poor mechanical property of a printed article. In addition, since the state of materials is not synchronized, a shape of an object obtained after fusion of materials on adjacent passes is also relatively rough. Taking printing a cylinder as an example, as shown in FIG. 11, a cylinder 51 is printed in a pass overlap manner by using a conventional 3D printing technique. The cylinder 51 not only has an overall rough shape and contour, but also has a plurality of notches 53 due to poor material fusion in a process of pass overlap.

A 3D printing head 3 provided by an embodiment of the present application always tracks a cross-sectional contour line of a target printing region by adjusting a length and a position of a discharge port 35. Therefore, a printing process of the 3D printing head 3 does not need to be performed on a pass-by-pass basis according to a pass, so that it is not necessary to perform a pass overlap, and no problem of poor fusion occurs. Therefore, an article printed by the 3D printing head 3 has a high mechanical property. Also, taking printing a cylinder as an example, as shown in FIG. 11, a cylinder 52 is printed by a 3D printing head 3. Compared to the cylinder 51, a filling material of the cylinder 52 is in good fusion condition, and there is no problem of poor fusion caused by a pass overlap.

Figure 12:
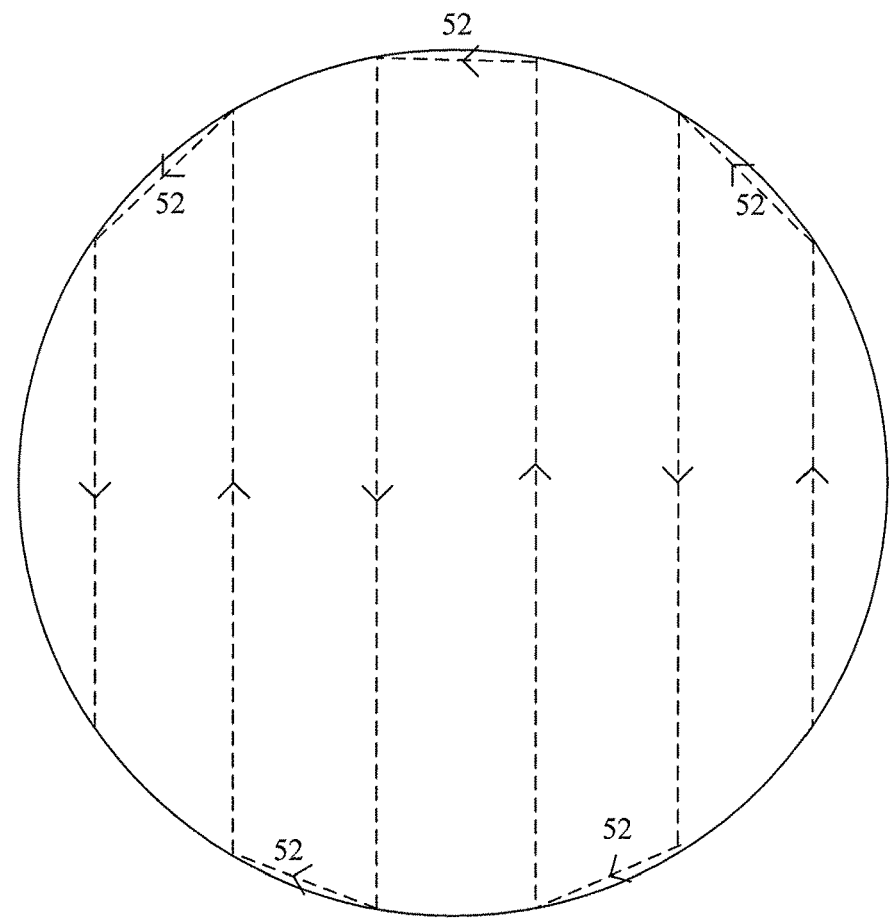
FIG. 12 is an exemplary diagram of a pass switching manner in a conventional 3D printing process.

Still taking printing a cylinder as an example, referring to FIG. 12, in a conventional 3D printing process, a switch between passes is performed according to a fold line 52 instead of a real contour curve, that is, using a fold line to approximate a real contour curve, resulting in that a contour line of a printed cylinder 51 is relatively rough. A 3D printing head 3 provided by an embodiment of the present application does not need to print according to a pass, but tracks a contour line of a target printing region by adjusting a length and a position of a discharge port 35. Therefore, a contour line of a cylinder 52 printed by the 3D printing head 3 is also smoother and more realistic.

A filling path of the 3D printing head 3 during printing of a target filling region is not specifically limited in the embodiment of the present application, which may be a planar movement in any manner. For example, in a process of filling a target filling region, a 3D printing head 3 can move along a unidirectional straight line under control of a control apparatus 4, that is, a filling path of the 3D printing head 3 during printing of the target filling region is a unidirectional straight path. A filling path of the 3D printing head 3 during printing of a target filling region is set as a unidirectional straight path, which simplifies a control manner and further improves printing efficiency compared with a parallel linear reciprocating path generally used in conventional 3D printing. From another perspective, according to an embodiment of the present application, a simple unidirectional straight line movement of a 3D printing head 3 may completely fill a target filling region, which not only improves printing efficiency, but also simplifies a control manner of the 3D printing head.

The target filling region pointed above may be all or part of a filling region enclosed by a cross-sectional contour line of a current layer. How a target filling region is divided will be exemplified and described below.

Figure 13:
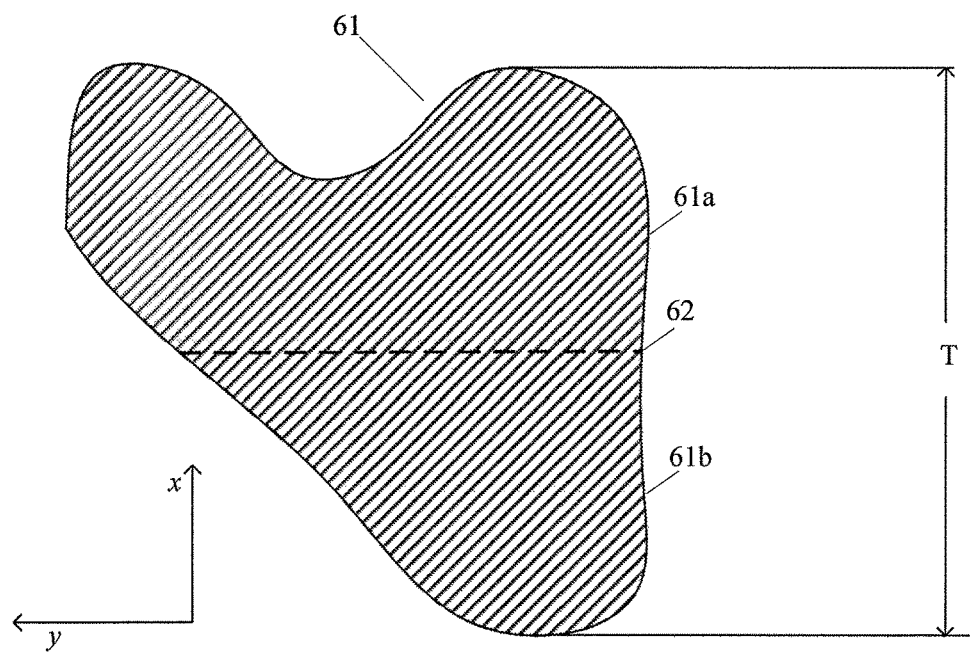
FIG. 13 is an exemplary diagram of a shape of a layer cross-sectional contour.

As an example, as shown in FIG. 13, a region enclosed by a cross-sectional contour line of a current layer is a complete connected region 61. T is a maximum width of the region 61 in an x direction. It is assumed that a length direction of a discharge port 35 of a 3D printing head 3 is the x direction and a maximum length of the discharge port 35 is not less than T, the region 61 may be determined as a target filling region. In a process of printing the current layer, the 3D printing head 3 may be controlled to perform a unidirectional straight line movement along a y direction, and during the movement, positions of ends 351 and 352 of the discharge port 35 are adjusted by a drive apparatus 33, so that projection positions of the ends 351, 352 in a vertical direction are on a cross-sectional contour line of the region 61. In this way, the 3D printing head 3 may complete printing of the current layer through one unidirectional straight line movement.

As another example, as shown in FIG. 13, it is assumed that a maximum length of a discharge port 35 is less than T, a region 61 cannot be completely filled at a time. In this case, the region 61 may be divided into a region 61a and a region 61b, where the region 61a and the region 61b are demarcated by a dashed line 62. In a process of printing a current layer, the region 61a may be first set as a target filling region, and a 3D printing head 3 is controlled to perform a unidirectional straight line movement along a positive direction of a y-axis, so that the region 61a is completely filled at a time; then the region 61b is set as a target filling region, and the 3D printing head 3 is controlled to perform a unidirectional straight line movement along a negative direction of the y-axis, so that the region 61b is completely filled at a time.

Figure 14:
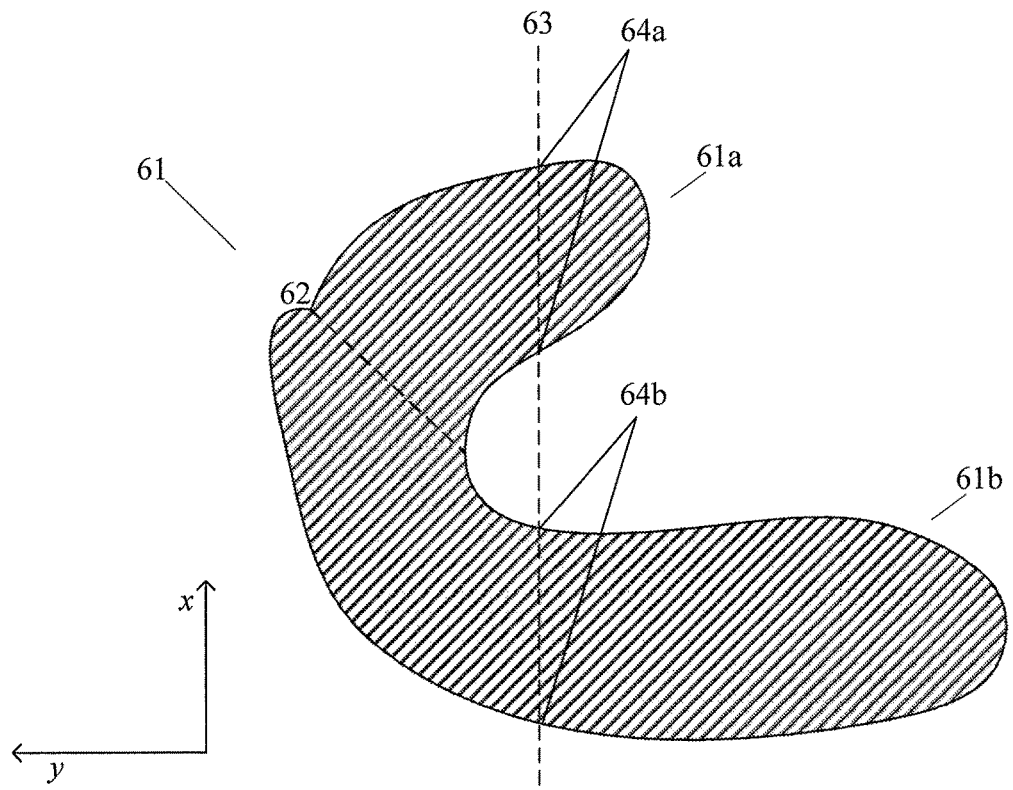
FIG. 14 is another exemplary diagram of a shape of a layer cross-sectional contour.

As another example, as shown in FIG. 14, a region enclosed by a cross-sectional contour line of a current layer is a complete connected region 61, and a length direction of a discharge port 35 is an x direction and a movement direction of a 3D printing head is a positive direction of a y axis. As can be seen from FIG. 14, at a position where a dashed line 63 is located, an intercept line of a cross-sectional contour line of the region 61 along an x-axis direction is intercepted to a line segment 64a and a line segment 64b. When the 3D printing head 3 moves in the positive direction along the y-axis to the position where the dashed line 63 is located, the discharge port 35 cannot completely fill a region corresponding to the line segment 64a and the line segment 64b at the same time. Therefore, when a layer having a similar structure as FIG. 14 needs to be printed, the region 61 may be divided in advance. For example, the region 61 may be divided into the region 61a and the region 61b as shown in FIG. 14, where the region 61a and the region 61b are demarcated by a dashed line 62. In a process of printing a current layer, the region 61a may be set as a target filling region first, and the 3D printing head 3 is controlled to perform a unidirectional straight line movement along the positive direction of the y-axis, so that the region 61a is completely filled at a time; then the region 61b is set as a target filling region, and the 3D printing head 3 is controlled to perform a unidirectional straight line movement along a negative direction of the y-axis, so that the region 61b is completely filled at a time.

Figure 15:
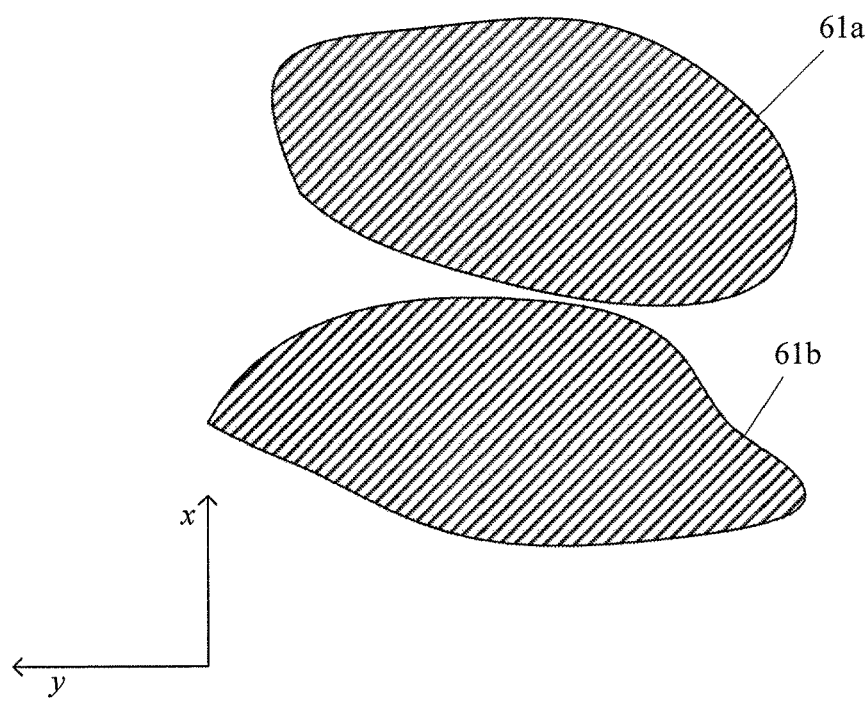
FIG. 15 is yet another exemplary diagram of a shape of a layer cross-sectional contour.

As yet another example, as shown in FIG. 15, a region enclosed by a cross-sectional contour line of a current layer includes a plurality of regions 61a, 61b separated from each other. When a layer having a similar structure as FIG. 15 needs to be printed, these regions may be respectively identified as target filling regions for printing. For example, the region 61a may be set as a target filling region first, and a 3D printing head 3 is controlled to perform a unidirectional straight line movement along a positive direction of a y-axis, so that the region 61a is completely filled at a time; then the region 61b is set as a target filling region, and the 3D printing head 3 is controlled to perform a unidirectional straight line movement along a negative direction of the y-axis, so that the region 61b is completely filled at a time.

It should be noted that, the above descriptions mainly take a length direction of a discharge port 35 of a 3D printing head 3 as an x direction and a movement direction of the 3D printing head 3 as a y direction as an example, but the embodiment of the present application is not limited thereto. For example, in some embodiments, a movement direction of a 3D printing head 3 may be a y direction, and a length direction of a discharge port 35 may not be perpendicular to the y direction. For another example, in some embodiments, a length direction of a discharge port 35 may be an x direction, and a movement direction of a 3D printing head 3 may not be perpendicular to the x direction.

In the examples shown in FIG. 14 and FIG. 15, intercept lines of a cross-sectional contour line of a current layer along an opening direction are all intercepted into multiple line segments. For convenience of description, a layer having a similar structure is referred to as a layer having multiple passes of separated structure herein.

Figure 16:
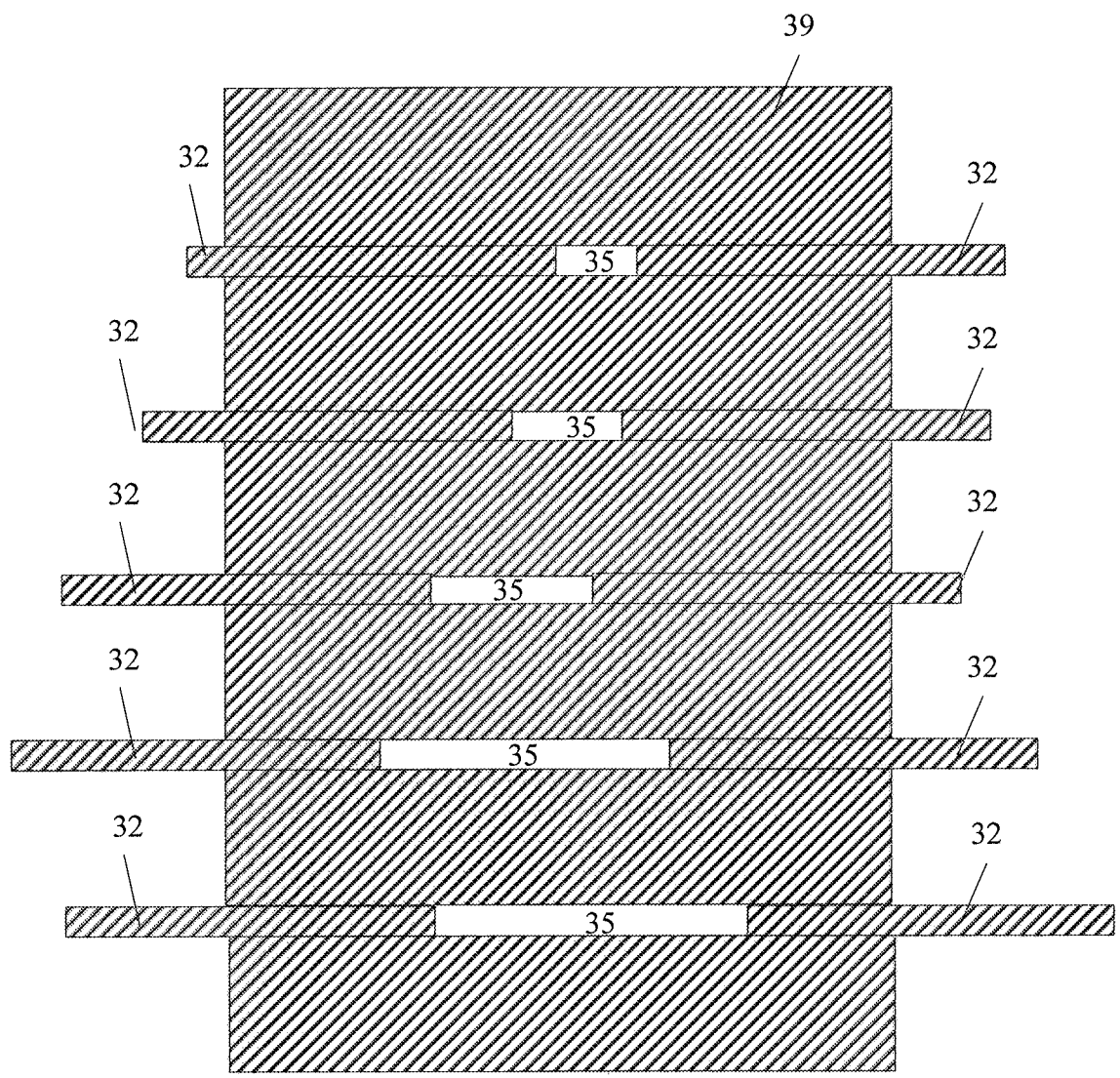
FIG. 16 is an upward view of a bottom structure of a feeding pipe provided by yet another embodiment of the present application.

Optionally, in some embodiments, as shown in FIG. 16, a bottom 39 of a feeding pipe 31 may be provided a plurality of discharge ports 35, and different discharge ports 35 may correspond to different target filling regions in a current layer.

If only one discharge port 35 is provided at a bottom of the feeding pipe 31, in the case that the current layer has multiple passes of separated structure, the 3D printing head 3 generally needs to perform multiple times of unidirectional straight line movements to fill the current layer completely. In order to improve printing efficiency, in the embodiment of the present application, the bottom 39 of the feeding pipe 31 is provided with a plurality of discharge ports 35, and different discharge ports 35 may correspond to different target filling regions in the current layer. In this way, even if the current layer has multiple passes of separated structure, the 3D printing head 3 may print the current layer completely through one unidirectional straight line movement by a manner of assigning different target filling regions to different discharge ports 35. Taking FIG. 14 or FIG. 15 as an example, it is assumed that a bottom 39 of a feeding pipe 31 includes a first discharge port and a second discharge port. A target filling region 61a may be assigned to the first discharge port and a target filling region 61b may be assigned to the second discharge port. In a process of printing the current layer, the 3D printing head 3 may be controlled to perform a unidirectional straight line movement along a positive direction of the y-axis, and during the movement of the 3D printing head 3, the first discharge port is controlled to completely fill the region 61a at a time and the second discharge port is controlled to completely fill the region 61b at a time. It can be seen that by providing a plurality of discharge ports 35 at the bottom 39 of an output pipe 22, even if the current layer has multiple passes of separated structure, the current layer may also be completely filled with the 3D printing head 3 at a time.

It should be noted that a quantity of the discharge ports 35 is not specifically limited in the embodiment of the present application. For example, two discharge ports, three discharge ports or even more discharge ports may be provided. In addition, an arrangement manner among a plurality of discharge ports and a structural size of each discharge port are not specifically limited in the embodiment of the present application. For example, a plurality of discharge ports 35 may be disposed parallel to each other, as shown in FIG. 16; for another example, a plurality of discharge ports 35 may be arranged at a fixed angle (for example, 10 degrees or 15 degrees) with each other. In addition, a maximum length and a maximum width of each discharge port 35 may be the same or different, which is not specifically limited in the embodiment of the present application.

It should also be noted that when a plurality of discharge ports are disposed at the bottom of the feeding pipe 31, the plurality of discharge ports are not necessarily used simultaneously, and may be freely selected according to actual conditions. For example, in the case that the current layer does not have multiple passes of separated structure, one discharge port may be used to fill the current layer completely at a time (other discharge ports may be in a fully closed state). For another example, in the case that the current layer does not have multiple passes of separated structure, two or more discharge ports may be used to fill the current layer completely at a time. For yet another example, in the case that the current layer has multiple passes of separated structure, two or more discharge ports may be used to fill the current layer completely at a time. For yet another example, in the case that a current layer has multiple passes of separated structure, one discharge port may be used to fill the current layer multiple times.

Optionally, in some embodiments, a sum of target filling regions corresponding to a plurality of discharge ports may be equal to all of a filling region of the current layer. In this way, the 3D printing head 3 may use a plurality of discharge ports to print the current layer completely at a time, further improving printing efficiency.

Optionally, in some embodiments, as shown in FIG. 4, a feeding apparatus 36 may be configured for a 3D printing head 3. The feeding apparatus 36 may be connected to a feeding pipe 31. The feeding apparatus 36 may receive a control instruction of a control apparatus 4 and adjusts an amount of material extruded from a discharge port 35 according to the control instruction of the control apparatus 4.

Further, in some embodiments, the feeding apparatus 36 may adjust the amount of material extruded from the discharge port 35, so that the amount of material extruded from the discharge port 35 varies with a length of the discharge port 35 or a change of a contour of a target filling region.

For example, the feeding apparatus 36 may adjust the amount of material extruded from the discharge port 35, so that the amount of material extruded from the discharge port 35 matches (or corresponds to) the length of the discharge port 35. The matching between the amount of material extruded from the discharge port 35 and the length of the discharge port 35 may indicate that the amount of material extruded from the discharge port 35 is approximately proportional to the length of the discharge port 35, so that the longer the length of the discharge port 35, the greater material flow conveyed from the feeding apparatus 36 to the discharge port 35, and larger amount of material is extruded from the discharge port 35 accordingly.

A feeding apparatus 36 provided by the embodiment of the present application can accurately control the amount of material extruded from the discharge port 35 according to the length of the discharge port 35 under control of the control apparatus 4, so as to further provide a foundation for taking both printing efficiency and printing accuracy of the 3D printing into account.

Figure 17:
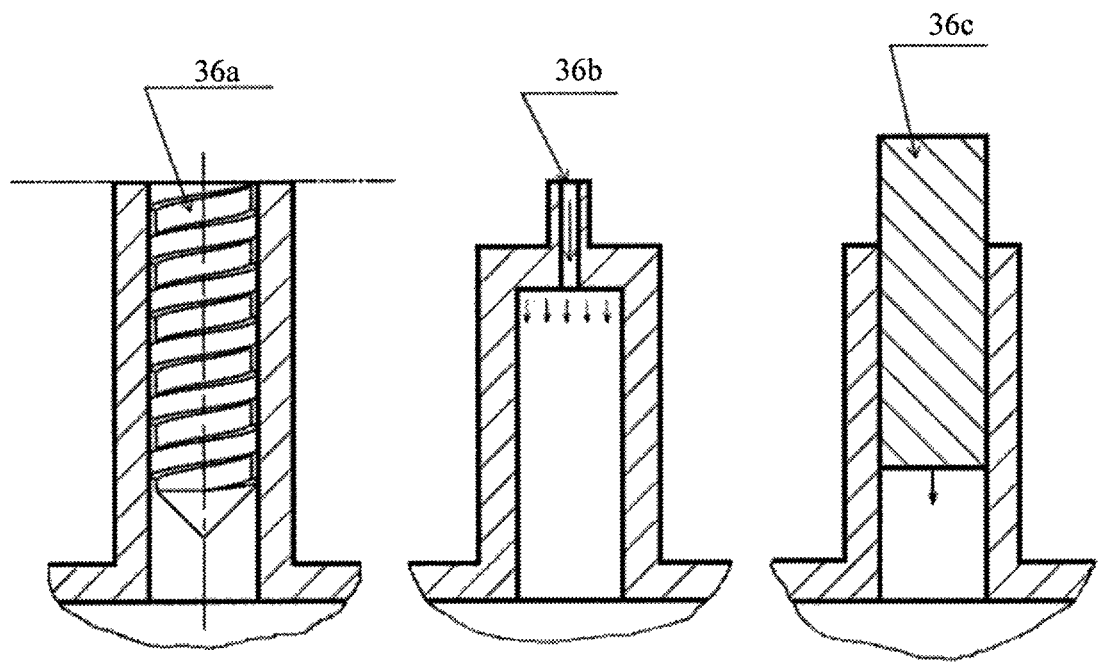
FIG. 17 is an exemplary diagram of a structure of a feeding apparatus provided by an embodiment of the present application.

A feeding apparatus 36 may be, for example, a stepless variable flow feeding apparatus; however, a form of the feeding apparatus 36 is not specifically limited in the embodiment of the present application. As shown in FIG. 17, the feeding apparatus 36 may be a screw feeding apparatus 36a, a pneumatic feeding apparatus 36b or a piston feeding apparatus 36c.

In the case that the feeding apparatus 36 is a screw feeding apparatus, an amount of material extruded from a discharge port 35 may be controlled by adjusting a rotation speed of a screw; in the case that the feeding apparatus 36 is a pneumatic feeding apparatus, the amount of material extruded from the discharge port 35 may be controlled by adjusting a pressure acting on a liquid surface of a feeding pipe 31; and in the case that the feeding apparatus 36 is a piston feeding apparatus, the amount of material extruded from the discharge port 35 may be controlled by adjusting a moving speed of a piston in a piston cylinder.

Optionally, in some embodiments, as shown in FIG. 4, the feeding pipe 31 may include a material cavity 37 disposed between the discharge port 35 and the feeding apparatus 36, and a temperature control apparatus 38 disposed at the material cavity 37. The temperature control apparatus 38 may be, for example, a heating apparatus. The temperature control apparatus 38, for example, may be disposed outside the material cavity 37. The temperature control apparatus 38 may be used to control a temperature of the material cavity 37.

In an embodiment of the present application, a material cavity 37 is disposed in a feeding pipe 31. Therefore, before 3D printing, a sufficient material may be stored in the material cavity 37 and controlled to be in a molten state through a temperature control apparatus 38. In actual printing, the material in the material cavity 37 may be directly fed to the discharge port 35 to simplify a material feeding manner of a 3D printing head. In addition, an opening 34 is located at a bottom of the material cavity 37. In order to enable a length of a discharge port to be adjusted within a relatively large range, the material cavity 37 is generally in a large size. As for a large-size material cavity, it is convenient to perform accurate temperature control, and the accurate temperature control is very important for accurate control of stability of a printing process and enabling a material at a newly printed contour edge to be in the most reasonable flow state, which can improve formation accuracy and process stability of a printed article. Since a larger material cavity may store a larger volume of material and the larger volume of material has a larger heat capacity, the greater the heat capacity, the more favorable it is to achieve accurate temperature control.

As shown in FIG. 4, an embodiment of the present application further provides a 3D printing device 2. The 3D printing device 2 includes a 3D printing head 3. Further, in some embodiments, the 3D printing device 2 may further include a control apparatus 4 and/or a printing platform 8.

Optionally, in some embodiments, the control apparatus 4 may generate a control instruction of the control apparatus 4 according to layer data of a current layer, where the layer data may include cross-sectional contour information of the current layer. The cross-sectional contour information of the current layer may, for example, indicate a shape and/or a position of a cross-sectional contour line of a current layer. It should be understood that the control instruction of the control apparatus 4 may include one or more of the following control instructions: a control instruction for driving a movement of a shutter 33, which may be, for example, used to control a position of an end 351 and/or an end 352 of a discharge port 35 in an opening 34; a control instruction for controlling a filling path of the 3D printing head 3, which may be, for example, used to control the 3D printing head 3 to move in a unidirectional straight line; and a control instruction for controlling material flow conveyed from a feeding apparatus 36 to the discharge port 35, which may be, for example, used to control an amount of material extruded from the discharge port 35.

The control apparatus 4 in the present application may be set centrally or separately. For example, the control apparatus 4 is a distributed control apparatus including a first control apparatus and a second control apparatus which are separately disposed, the first control apparatus is used to control a drive apparatus 33, and the second control apparatus is used to control the feeding apparatus 36. For another example, the control apparatus 4 is a centralized control apparatus that may be used to control the drive apparatus 33 and the feeding apparatus 36 collectively.

Taking a target filling region of the current layer as a region 41 shown in FIG. 3a as an example, the control apparatus 4 may pre-calculate a y-coordinate of each position of position $A_1$ (i.e., the position where pass $A_1$ in FIG. 3a is located) to position $A_{25}$ (i.e., the position where pass $A_{25}$ in FIG. 3a is located) and positions and lengths of intercept line segments of a cross-sectional contour line 42 along a length direction of the discharge port 35 (in FIG. 3, the length direction of the discharge port is set as an x direction) according to the cross-sectional contour information of the current layer. In the process of filling the target filling region, the control apparatus 4 may control the 3D printing head 3 to move from position $A_1$ to position $A_{25}$ and send the control instruction to the drive apparatus 33 during the movement, thereby adjusting positions of the end 351 and/or the end 352 in the opening 34 through the drive apparatus 33, so that projection positions of the ends 351, 352 in a vertical direction are always located on the cross-sectional contour line 42. For example, when the control apparatus 4 controls the 3D printing head 3 to move to position $A_1$, the control apparatus 4 may adjust the position of the end 351 and/or the position of the end 352 in the opening 34 through the drive apparatus 33 to enable the ends 351, 352 of the discharge port 35 to be located directly above points p1 and p2, respectively, so that the region where a line segment p1-p2 is located is completely filled; when the control apparatus 4 controls the 3D printing head 3 to move to position $A_{11}$, the control apparatus 4 may adjust the position of the end 351 and/or the position of the end 352 in the opening 34 through the drive apparatus 33 to enable the ends 351, 352 of the discharge port 35 to be located directly above points p3 and p4, respectively, so that the region where a line segment p3-p4 is located is completely filled; when the control apparatus 4 controls the 3D printing head 3 to move to position $A_{25}$, the control apparatus 4 may adjust the position of the end 351 and/or the position of the end 352 in the opening 34 through the drive apparatus 33 to enable the ends 351, 352 of the discharge port 35 to be located directly above points p5 and p6, respectively, so that the region where a line segment p5-p6 is located is completely filled at the same time.

Still taking a target filling region of the current layer as the region 41 shown in FIG. 3a as an example, the control apparatus 4 may pre-calculate the y-coordinate of each position of position $A_1$ to position $A_{25}$ and lengths of intercept line segments of the cross-sectional contour line 42 along an x direction according to the cross-sectional contour information of the current layer. In the process of filling the region 41, the control apparatus 4 may control the 3D printing head 3 to move from position $A_1$ to position $A_{25}$ and send the control instruction to the feeding apparatus 36 during the movement, thereby adjusting an amount of material extruded from the discharge port 35 through the feeding apparatus 36, so that the amount of material extruded from the discharge port 35 matches (or corresponds to, for example, the amount of extruded material is directly proportional to the obtained lengths of intercept line segments) the obtained lengths of intercept line segments. For example, when the control apparatus 4 controls the 3D printing head 3 to move to position $A_1$, the control apparatus 4 may adjust the amount of material extruded from the discharge port 35 through the feeding apparatus 36, so that the amount of material extruded from the discharge port 35 matches a length of the line segment p1-p2, thereby filling the region where the line segment p1-p2 is located completely at the same time; when the control apparatus 4 controls the 3D printing head 3 to move to position $A_{11}$, the control apparatus 4 may adjust the amount of material extruded from the discharge port 35 through the feeding apparatus 36, so that the amount of material extruded from the discharge port 35 matches a length of the line segment p3-p4, thereby filling the region where the line segment p3-p4 is located completely at the same time; when the control apparatus 4 controls the 3D printing head 3 to move to position $A_{25}$, the control apparatus 4 may adjust the amount of material extruded from the discharge port 35 through the feeding apparatus 36, so that the amount of material extruded from the discharge port 35 matches a length of the line segment p5-p6, thereby filling the region where the line segment p5-p6 is located completely at the same time.

A method embodiment of the present application will be described below. Since the method embodiment may be performed by the 3D printing device 2 described above, for example, by the control apparatus 4 in the 3D printing device 2, the parts not described in detail may be referred to the respective apparatus embodiments previously described.

Figure 18:
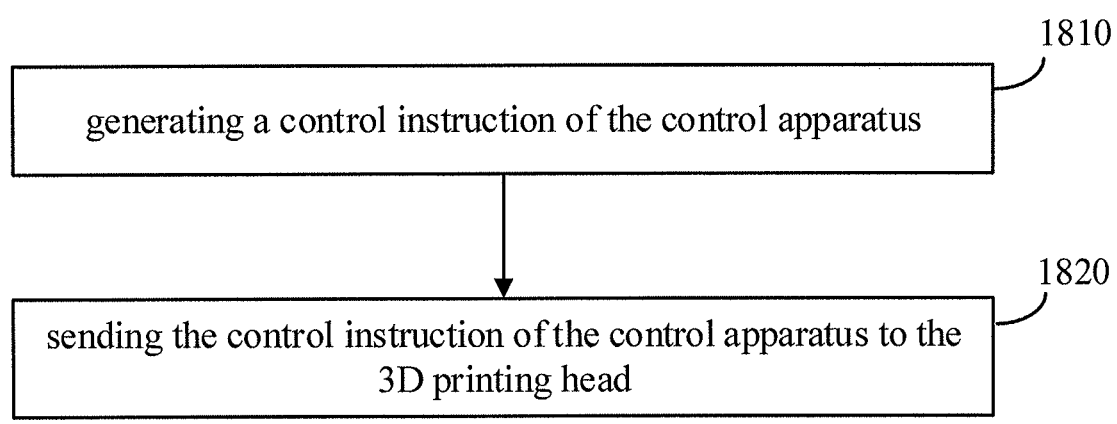
FIG. 18 is a schematic flowchart of a control method of a 3D printing head provided by one embodiment of the present application.

An embodiment of the present application further provides a control method of a 3D printing head 3. As shown in FIG. 18, the control method includes:

step 1810, generating a control instruction of the control apparatus; and step 1820, sending the control instruction of the control apparatus to the 3D printing head.

Figure 19:
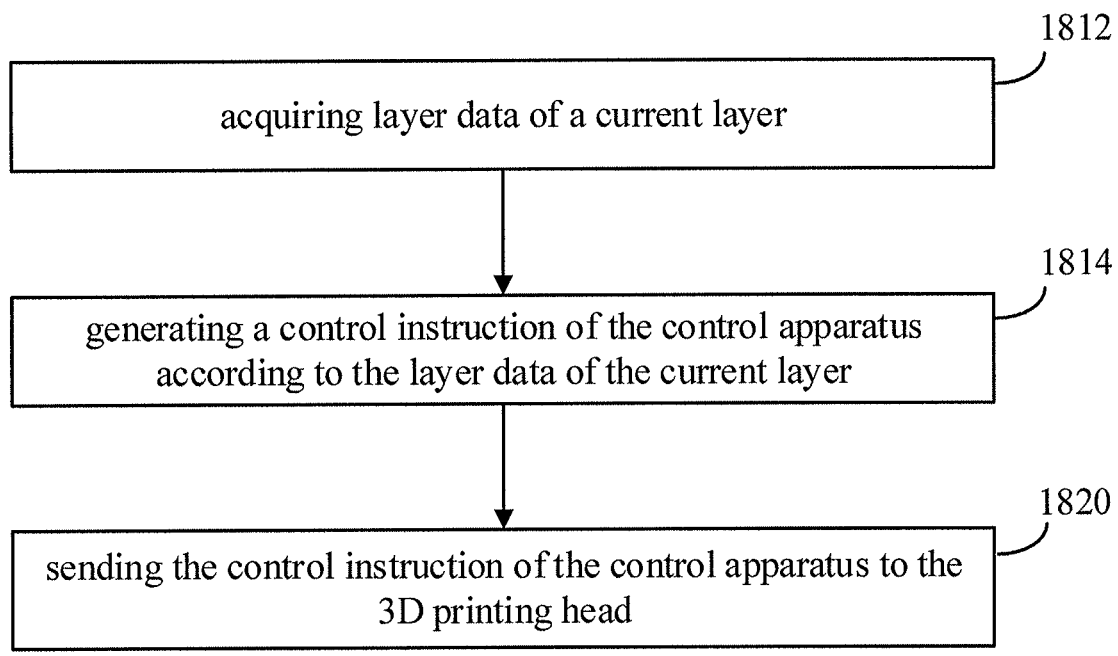
FIG. 19 is a schematic flowchart of a control method of a 3D printing head provided by another embodiment of the present application.

Optionally, in some embodiments, as shown in FIG. 19, the control method specifically includes:

step 1812, acquiring layer data of a current layer, where the layer data includes information of a cross-sectional contour line of the current layer;

step 1814, generating a control instruction of the control apparatus according to the layer data of the current layer; and step 1820, sending the control instruction of the control apparatus to the 3D printing head.

The above embodiments may completely or partly be implemented in software, hardware, firmware or a random combination thereof. When being achieved by software, it may completely or partly be implemented in the form of a computer program product. The computer program product includes one or more computer instructions. When the computer program instructions are loaded and executed on a computer, the processes or functions described according to the embodiments of the present application are completely or partly generated. The computer may be a general-purpose computer, a special-purpose computer, a computer network or other programmable apparatus. The computer instructions may be stored in a computer-readable storage medium or transmitted from one computer-readable storage medium to another computer-readable storage medium. For example, the computer instructions may be transmitted from a web site, a computer, a server or a data center to another web site, computer, server or data center in a wired mode (for example, a coaxial cable, an optical fiber, a digital subscriber line (DSL)) or a wireless mode (for example, infrared, radio, microwave or the like). The computer-readable storage medium may be any available medium capable of being accessed by a computer or a data storage device including a server, a data center or the like integrated by one or more available media. The available medium may be a magnetic medium (for example, a soft disk, a hard disk, a magnetic tape), an optical medium (for example, a digital video disc (DVD)), or a semiconductor medium (for example, a solid state disk (SSD)) or the like.

Those of ordinary skill in the art may be aware that, units and algorithm steps of the examples described in the embodiments disclosed in the text can be implemented by electronic hardware, or a combination of computer software and electronic hardware. Whether these functions are implemented in the form of hardware or software is determined by specific applications and design constraint conditions of the technical solutions. Those skilled may implement the described functions by using different methods for each specific application, but this implementation should not be considered as beyond the scope of the present application.

In the several embodiments provided in the present application, it should be understood that, the disclosed system, apparatus and method may be implemented in other manners. For example, the apparatus embodiments described above are merely exemplary, e.g., the division of the units is merely a logic function division, other division manners may exist in practical implementation, for example, a plurality of units or components may be combined or integrated into another system, or some features may be omitted or not implemented. In addition, the displayed or discussed mutual coupling or direct coupling or communication connection may be indirect coupling or communication connection via some interfaces, apparatuses or units, and may be in electrical, mechanical or other forms.

The units described as separate parts may be or may not be separated physically, and a component displayed as a unit may be or may not be a physical unit, namely, may be located in one place, or may be distributed on a plurality of network units. A part of or all of the units may be selected to achieve the purposes of the solutions in the present embodiments according to actual demands.

In addition, the respective functional units in the embodiments of the present application may be integrated into a processing unit, or the respective units exist separately and physically, or two or more units are integrated in one unit.

The foregoing description is only the specific implementation of the present application, but the protection scope of the present application is not limited thereto, those skilled who are familiar with the art could readily think of variations or substitutions within the technical scope disclosed by the present application, and these variations or substitutions shall fall within the protection scope of the present application. Therefore, the protection scope of the claims should prevail over the protection scope of the present application.

What is claimed is:

1. A control method of a 3D printing head, wherein the 3D printing head comprises:

a feeding pipe, provided with an opening at a bottom of the feeding pipe;

a shutter, disposed at the opening and slidably connected to the bottom, wherein the opening comprises a region occluded by the shutter and a region not occluded by the shutter, and the region not occluded by the shutter forms a discharge port of the 3D printing head, wherein the discharge port comprises a first end and a second end, and the first end and the second end define a length of the discharge port; and a drive apparatus, connected to the shutter;

the control method comprises:

generating a control instruction of a control apparatus; and sending the control instruction of the control apparatus to the drive apparatus, wherein the control instruction is used to drive the shutter sliding at the opening to adjust at least one of a position of the first end and a position of the second end in the opening, so as to adjust the length of the discharge port, wherein in a process of filling a target filling region in a current layer, the drive apparatus drives the shutter sliding at the opening according to the control instruction of the control apparatus to adjust at least one of the position of the first end and the position of the second end in the opening, so that projection positions of the first end and the second end in a vertical direction are located on the cross-sectional contour line of the target filling region, and the length of the discharge port matches lengths of intercept line segments of a cross-sectional contour line of the target filling region along a length direction of the discharge port, wherein the target filling region is at least part of a filling region of the current layer;

wherein in the process of filling the target filling region, the 3D printing head moves along a one-way straight line under a control of the control apparatus, and the bottom structure of the feeding pipe is provided with a plurality of discharge ports, and the plurality of discharge ports are configured such that when an intercept line of a cross-sectional contour line of the current layer along an opening direction is intercepted into multiple line segments, the different discharge ports correspond to different target filling regions in the current layer and the 3D printing head print the current layer completely through one unidirectional straight line movement.

2. The control method of a 3D printing head according to claim 1, wherein the control instruction is used to drive the shutter sliding at the opening according to the control instruction of the control apparatus to adjust at least one of the position of the first end and the position of the second end in the opening, so that projection positions of the first end and the second end in a vertical direction are located on the cross-sectional contour line of the target filling region.

3. The control method according to claim 1, wherein the generating a control instruction of the control apparatus comprises:
acquiring layer data of a current layer, wherein the layer data comprises information of a cross-sectional contour line of the current layer; and
generating a control instruction of the control apparatus according to the layer data of the current layer.

4. A 3D printing head, comprising:
a feeding pipe, provided with an opening at a bottom of the feeding pipe;
a shutter, disposed at the opening and slidably connected to the bottom, wherein the opening comprises a region occluded by the shutter and a region not occluded by the shutter, and the region not occluded by the shutter forms a discharge port of the 3D printing head, wherein the discharge port comprises a first end and a second end, and the first end and the second end define a length of the discharge port; and
a drive apparatus, connected to the shutter, wherein the drive apparatus receives a control instruction of a control apparatus and drives the shutter sliding at the opening according to the control instruction of the control apparatus to adjust at least one of a position of the first end and a position of the second end in the opening, so as to adjust the length of the discharge port,
wherein in a process of filling a target filling region in a current layer, the drive apparatus drives the shutter sliding at the opening according to the control instruction of the control apparatus to adjust at least one of the position of the first end and the position of the second end in the opening, so that projection positions of the first end and the second end in a vertical direction are located on the cross-sectional contour line of the target filling region, and the length of the discharge port matches lengths of intercept line segments of a cross-sectional contour line of the target filling region along a length direction of the discharge port, wherein the target filling region is at least part of a filling region of the current layer;
wherein in the process of filling the target filling region, the 3D printing head moves along a one-way straight line under a control of the control apparatus, and
the bottom structure of the feeding pipe is provided with a plurality of discharge ports, and the plurality of discharge ports are configured such that when an intercept line of a cross-sectional contour line of the current layer along an opening direction is intercepted into multiple line segments, the different discharge ports correspond to different target filling regions in the current layer and the 3D printing head print the current layer completely through one unidirectional straight line movement.

5. The 3D printing head according to claim 1, wherein a sum of target filling regions corresponding to the plurality of discharge ports forms all of the filling region of the current layer.

6. The 3D printing head according to claim 1, wherein the discharge port comprises a third end and a fourth end, and the third end and the fourth end defines a width of the discharge port.

7. The 3D printing head according to claim 6, wherein the width of the discharge port is a fixed value.

8. The 3D printing head according to claim 1, wherein the 3D printing head further comprises:
a feeding apparatus, connected to the feeding pipe, wherein the feeding apparatus receives a control instruction of the control apparatus and adjusts an amount of material extruded from the discharge port according to the control instruction of the control apparatus, so that the amount of extruded material matches the length of the discharge port.

9. The 3D printing head according to claim 8, wherein the feeding pipe comprises a material cavity disposed between the discharge port and the feeding apparatus, and a temperature control apparatus disposed at the material cavity, wherein the temperature control apparatus is configured to control a temperature of the material cavity.

10. The 3D printing head according to claim 8, wherein the feeding apparatus is one of a screw feeding apparatus, a pneumatic feeding apparatus and a piston feeding apparatus.

11. The 3D printing head according to claim 1, wherein the opening comprises a fifth end and a sixth end, and the fifth end and the sixth end define a length of the opening, and the shutter comprises a first shutter and a second shutter, wherein the first shutter comprises the first end and a seventh end, the seventh end is located outside the fifth end, and the first end is located inside the fifth end, and the second shutter comprises the second end and an eighth end, wherein the eighth end is located outside the sixth end, and the second end is located inside the sixth end.

12. The 3D printing head according to claim 11, wherein a groove is disposed at the bottom of the feeding pipe, the opening is disposed on a bottom surface of the groove, and the first shutter and the second shutter are both movable blocks slidingly connected to the groove.

13. A 3D printing device, comprising a 3D printing head and a control apparatus, wherein the 3D printing head comprises:
a feeding pipe, provided with an opening at a bottom of the feeding pipe;
a shutter, disposed at the opening and slidably connected to the bottom, wherein the opening comprises a region occluded by the shutter and a region not occluded by the shutter, and the region not occluded by the shutter forms a discharge port of the 3D printing head, wherein the discharge port comprises a first end and a second end, and the first end and the second end define a length of the discharge port; and
a drive apparatus, connected to the shutter, wherein the drive apparatus receives a control instruction of the control apparatus and drives the shutter sliding at the opening according to the control instruction of the control apparatus to adjust at least one of a position of the first end and a position of the second end in the opening, so as to adjust the length of the discharge port,
wherein in a process of filling a target filling region in a current layer, the drive apparatus drives the shutter sliding at the opening according to the control instruction of the control apparatus to adjust at least one of the position of the first end and the position of the second end in the opening, so that projection positions of the first end and the second end in a vertical direction are located on the cross-sectional contour line of the target filling region, and the length of the discharge port matches lengths of intercept line segments of a cross-sectional contour line of the target filling region along a length direction of the discharge port, wherein the target filling region is at least part of a filling region of the current layer;

wherein in the process of filling the target filling region, the 3D printing head moves along a one-way straight line under a control of the control apparatus, and the bottom structure of the feeding pipe is provided with a plurality of discharge ports, and the plurality of discharge ports are configured such that when an intercept line of a cross-sectional contour line of the current layer along an opening direction is intercepted into multiple line segments, the different discharge ports correspond to different target filling regions in the current layer and the 3D printing head print the current layer completely through one unidirectional straight line movement.

14. The 3D printing device according to claim 13, wherein the control apparatus generates the control instruction of the control apparatus according to layer data of a current layer, wherein the layer data comprises cross-sectional contour information of the current layer.

* * * * *